United States Patent
Lekivetz et al.

(10) Patent No.: US 10,503,846 B2
(45) Date of Patent: Dec. 10, 2019

(54) CONSTRUCTING FLEXIBLE SPACE-FILLING DESIGNS FOR COMPUTER EXPERIMENTS

(71) Applicant: SAS Institute Inc., Cary, NC (US)

(72) Inventors: Ryan Adam Lekivetz, Cary, NC (US); Joseph Albert Morgan, Raleigh, NC (US); Bradley Allen Jones, Cary, NC (US)

(73) Assignee: SAS Institute Inc., Cary, NC (US)

(*) Notice: Subject to any disclaimer, the term of this patent is extended or adjusted under 35 U.S.C. 154(b) by 0 days.

(21) Appl. No.: 16/154,332

(22) Filed: Oct. 8, 2018

(65) Prior Publication Data

US 2019/0325095 A1     Oct. 24, 2019

Related U.S. Application Data

(60) Provisional application No. 62/681,651, filed on Jun. 6, 2018, provisional application No. 62/661,061, filed on Apr. 22, 2018.

(51) Int. Cl.
*G06F 17/50* (2006.01)
*G06F 17/16* (2006.01)
(Continued)

(52) U.S. Cl.
CPC .......... *G06F 17/5009* (2013.01); *G06F 17/16* (2013.01); *G06N 3/02* (2013.01);
(Continued)

(58) Field of Classification Search
CPC .. G06F 17/5009; G06F 17/16; G06F 2217/02; G06F 2217/04; G06F 2217/06; G06N 20/00; G06N 3/02; G06T 17/00
(Continued)

(56) References Cited

U.S. PATENT DOCUMENTS

2009/0125285 A1* 5/2009 Gugaliya .............. G05B 17/02
                                                         703/2
2013/0346036 A1* 12/2013 Borjesson ............ G06F 17/50
                                                         703/2
(Continued)

OTHER PUBLICATIONS

Xie et al. "General Sliced Latin Hypercube Designs"; Statistica Sinica 24; 2014; pp. 1239-1256.
(Continued)

*Primary Examiner* — Rehana Perveen
*Assistant Examiner* — Justin C Mikowski
(74) *Attorney, Agent, or Firm* — Coats & Bennett, PLLC

(57) ABSTRACT

A computing device generates representative points, each representing a potential design point for a design space. The computing device determines for the design space primary clusters, a categorical factor, and at least two levels for the categorical factor. The computing device, for each of the primary clusters, selects a design point from each sub-cluster of the respective primary cluster. The computing device, for each of the primary clusters, allocates the at least two levels of the categorical factor, such that a level of the at least two levels is allocated to each selected design point in the respective primary cluster. The computing device modifies an initial sub-design that represents the selected design points allocated a given level of the categorical factor by increasing separation between design points allocated a same level of the categorical factor. The computing device outputs to an output device a modified design for the design space.

30 Claims, 40 Drawing Sheets

(51) Int. Cl.
 *G06T 17/00* (2006.01)
 *G06N 3/02* (2006.01)
 *G06N 20/00* (2019.01)

(52) U.S. Cl.
 CPC ............. *G06N 20/00* (2019.01); *G06T 17/00* (2013.01); *G06F 2217/02* (2013.01); *G06F 2217/04* (2013.01); *G06F 2217/06* (2013.01)

(58) Field of Classification Search
 USPC .......................................................... 703/2
 See application file for complete search history.

(56) References Cited

U.S. PATENT DOCUMENTS

| | | | |
|---|---|---|---|
| 2014/0074758 A1* | 3/2014 | Amid | G06N 3/02 706/12 |
| 2015/0347641 A1* | 12/2015 | Gristede | G06F 17/505 716/104 |
| 2016/0147916 A1* | 5/2016 | Liu | G06F 17/5081 716/104 |
| 2017/0255721 A1* | 9/2017 | Kowatari | G06F 17/50 |

OTHER PUBLICATIONS

Joseph et al. "Maximum projection designs for computer experiments"; Biometrika Advance Access; Mar. 18, 2015; pp. 1-10.

Mak et al. "Minimax and minimax projection designs using clustering"; Paper; Oct. 28, 2016; pp. 1-43; arXiv:1602.03938v3 [stat.CO].

Lekivetz et al. "Fast Flexible Space-Filling Designs for Nonrectangular Regions"; Research Article; Wiley Online Library; Mar. 21, 2014; pp. 829-837; John Wiley & Sons, Ltd.

D'Huys et al. "Design and analysis of computer experiments for efficient model-based active thermography in the agro-food sector"; Retrieved from the internet: URL: https://www.ndt.net/search/docs.php3?showForm=off&id=20687 [retrieved on Sep. 10, 2018]; Feb. 2017; pp. 207-216; 10.21611/qirt.2016.026.

Keresztes et al. "Augmented design and analysis of computer experiments: a novel tolerance embedded global optimization approach applied to SWIR hyperspectral illumination design"; Optics Express 29380; Dec. 26, 2016; pp. 1-26; vol. 24, No. 26; Optical Society of America.

Dragulji'c et al. "Noncollapsing Space-Filling Designs for Bounded Nonrectangular Regions"; American Statistical Association and the American Society for Quality; Technometrics; May 2012; pp. 169-178; vol. 54; No. 2.

Ba, "Maximin-Distance (Sliced) Latin Hypercube Designs"; Package 'SLHD'; Jan. 28, 2015; pp. 1-5; Version 2,1-1.

Ba et al. "Optimal Sliced Latin Hypercube Designs"; American Statistical Association and the American Society for Quality; Technometrics; Nov. 2015; pp. 479-487; vol. 57; No. 4.

* cited by examiner

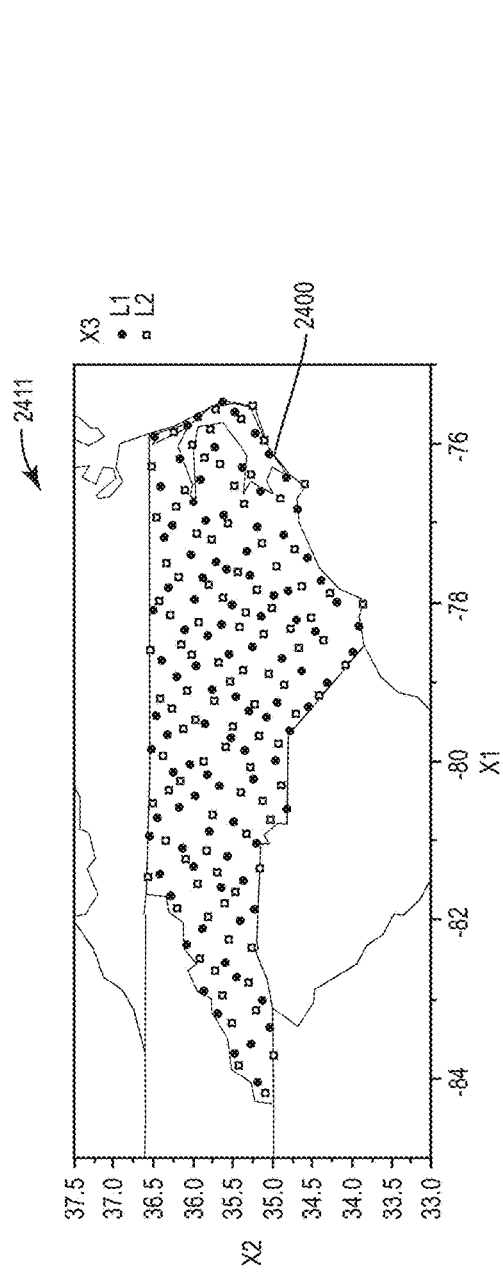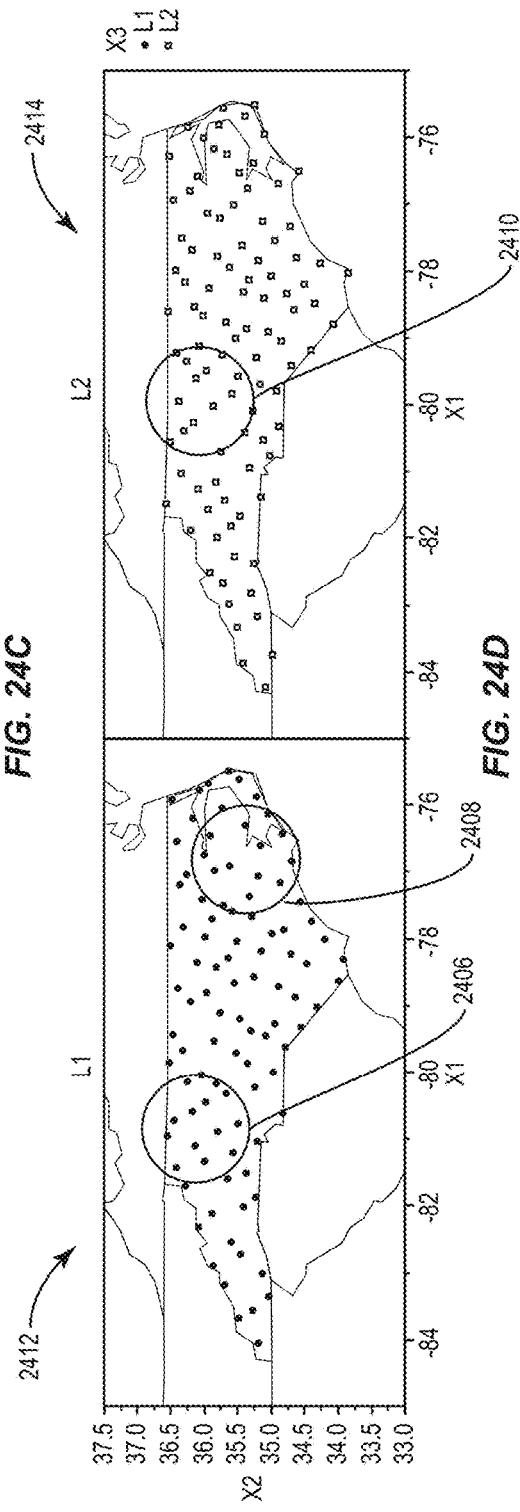
FIG. 24C
FIG. 24D

CONSTRUCTING FLEXIBLE SPACE-FILLING DESIGNS FOR COMPUTER EXPERIMENTS

RELATED APPLICATIONS

This application claims the benefit of U.S. Provisional Application No. 62/681,651, filed Jun. 6, 2018, and claims the benefit of U.S. Provisional Application No. 62/661,061, filed Apr. 22, 2018, the disclosures of each of which are incorporated herein by reference in their entirety.

BACKGROUND

Experiments are often conducted on computer models or designed by computer models. In some experiments, it is useful to distribute design points uniformly across a design space to observe responses in the experiment for different input factors at that design point. Such a design can be considered a space-filling design. For instance, if an experiment tests strain on a physical object like a pitcher, flask or drinking bottle, the design space models the shape of the physical object, and the design points distributed over the design space represents test points for strain. The dimensions of the design space define continuous variables for the design space (e.g., the height, width, and length of the object). The bottle in the experimental test, for example, may be a narrow-necked container made of impermeable material of various sizes to hold liquids of various temperatures.

In some experiments, it also helpful to observe how design options for the design space would influence the experiments. A categorical factor can be used to describe a design option or level at a design point for the design space. A categorical factor for the design space of the bottle could be a material type, with each of the design points taking on one of a set of levels that represent material types in the experiment. The material types for the bottle, for example, may be glass, metal, ceramic, and/or various types of plastic. In those cases where categorical factors are also employed, particularly on a non-rectangular design space like a bottle, it can be difficult to distribute the levels uniformly across the design.

SUMMARY

In an example embodiment, a computer-program product tangibly embodied in a non-transitory machine-readable storage medium is provided. The computer-program product includes instructions to cause a computing device to output a design for a design space. The computing device receives information defining a boundary for the design space. The computing device generates representative points. The representative points are each distributed on or within the design space and represent a potential design point for the design space. The computing device determines for the design space primary clusters, a categorical factor, and at least two levels for the categorical factor. The primary clusters each contain a different set of the representative points that is mutually exclusive of representative points in other primary clusters of the design space. The categorical factor defines a design category for the design space. Each of the at least two levels for the categorical factor defines different design options in the design category for the design space. The computing device, for each of the primary clusters, determines sub-clusters. Each of the sub-clusters contains different subsets of a respective set of the representative points that is mutually exclusive of representative points in other sub-clusters of a respective primary cluster of the primary clusters. The computing device, for each of the primary clusters, selects a design point from each sub-cluster of the respective primary cluster based on a first criterion representing separation between design points in the design space. The computing device, for each of the primary clusters, allocates the at least two levels of the categorical factor, such that a level of the at least two levels is allocated to each selected design point in the respective primary cluster. The computing device obtains an initial sub-design that represents the selected design points in the design space allocated a given level of the categorical factor. The computing device modifies the initial sub-design by increasing separation between design points allocated a same level of the categorical factor in the design space. The computing device outputs to an output device a modified design for the design space. The modified design represents locations for obtained design points in the design space in response to modification of the initial sub-design.

In another example embodiment, a computing device is provided. The computing device includes, but is not limited to, a processor and memory. The memory contains instructions that when executed by the processor control the computing device to output a design for a design space.

In another example embodiment, a method of outputting a design for a design space is provided.

Other features and aspects of example embodiments are presented below in the Detailed Description when read in connection with the drawings presented with this application.

BRIEF DESCRIPTION OF THE DRAWINGS

FIGS. 24A-24F illustrate a block diagram of design point selection for a non-rectangular design space in at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
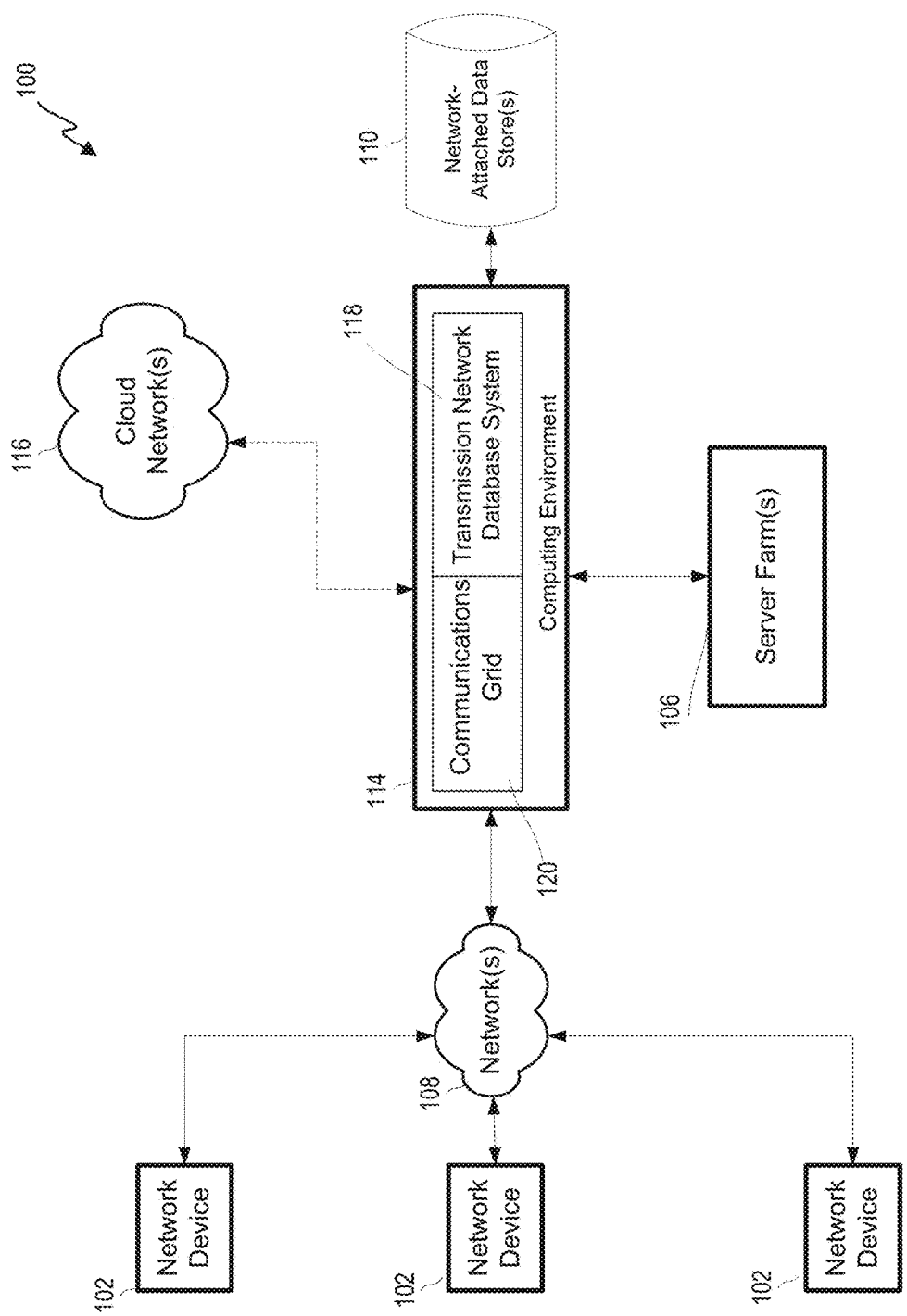
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
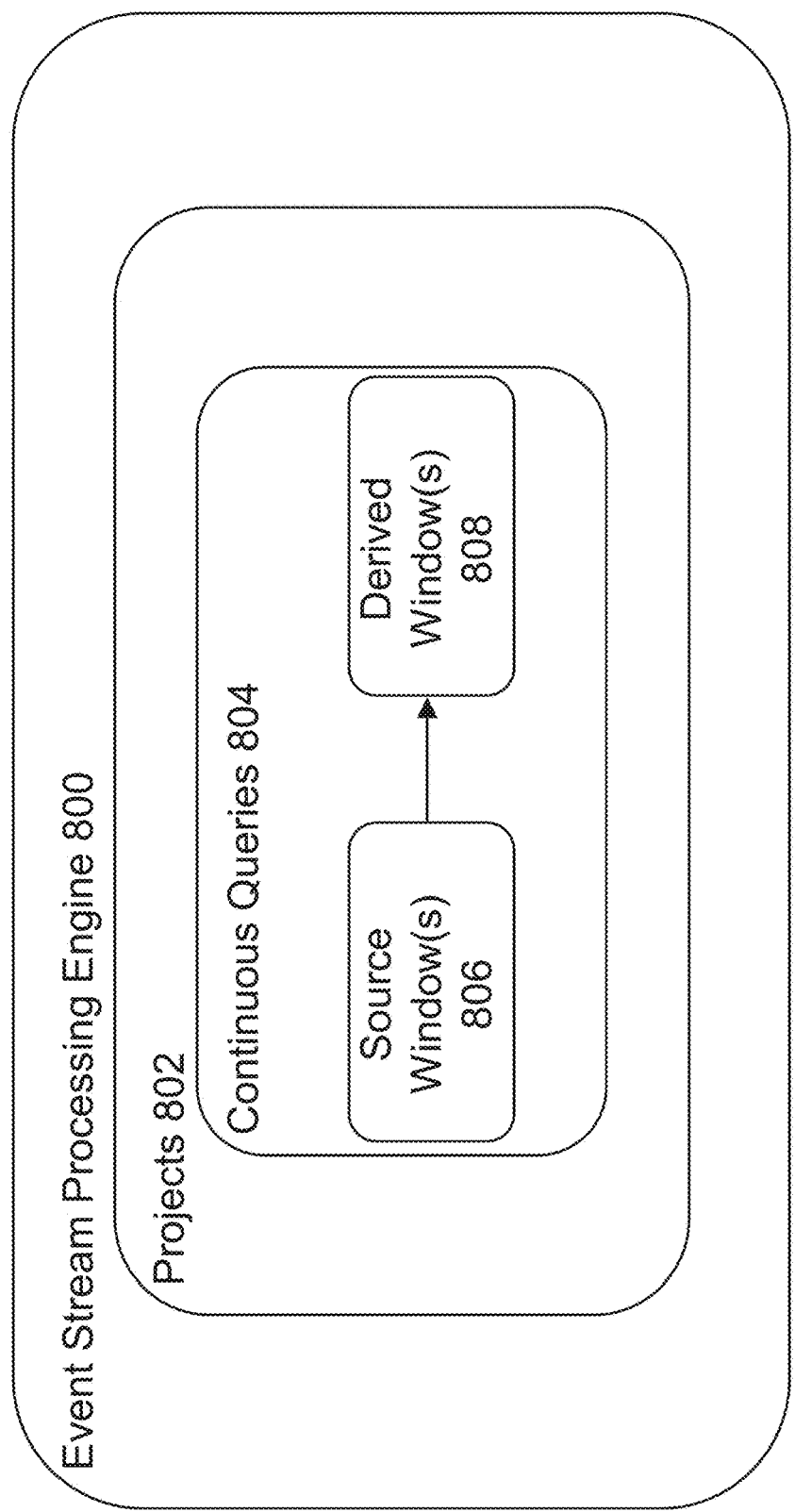
FIG. 8 illustrates a block diagram including components of an Event Stream Processing Engine (ESPE), according to at least one embodiment of the present technology.
Figure 9:
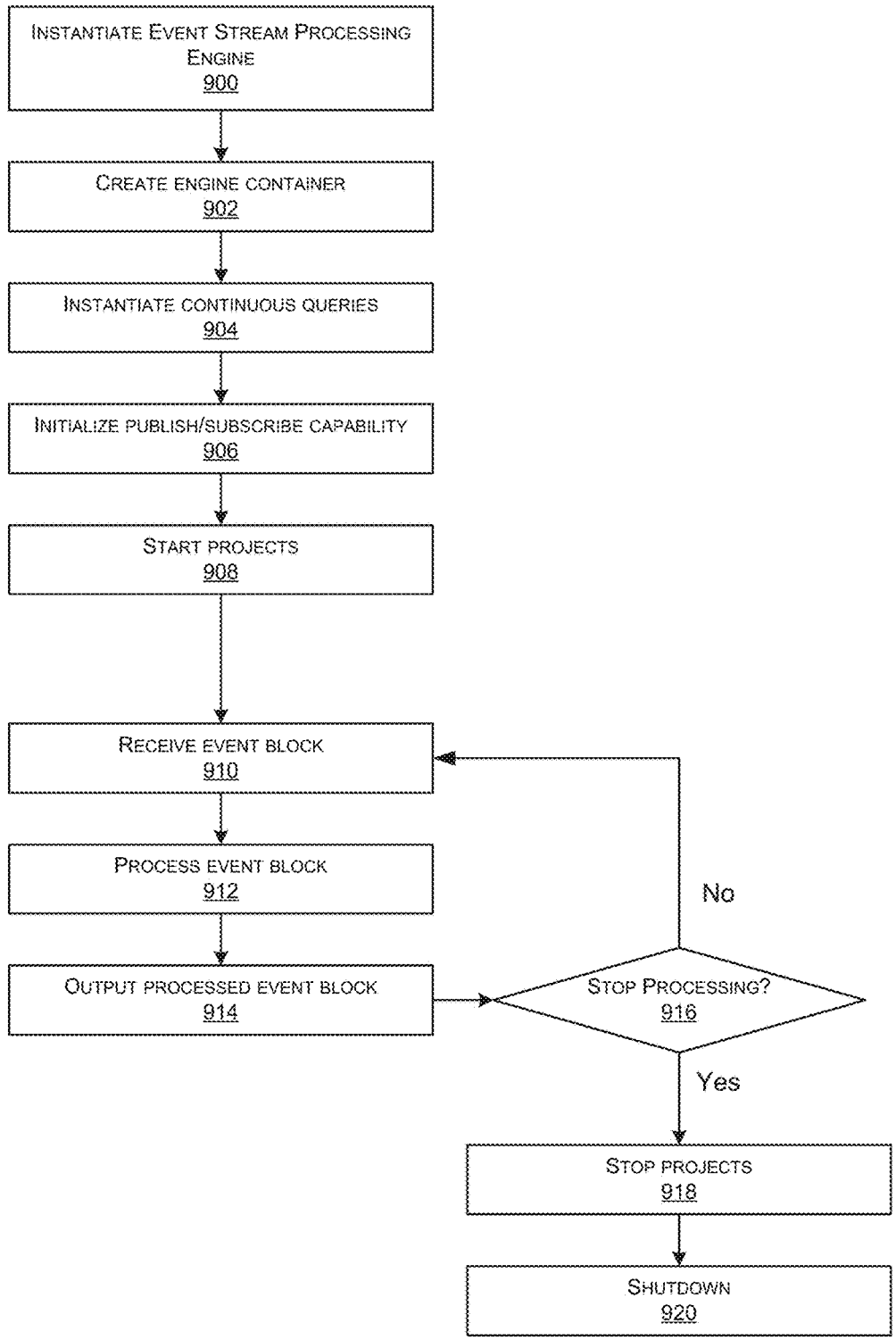
FIG. 9 illustrates a flow chart showing an example process including operations performed by an event stream processing engine, according to at least one embodiment of the present technology.
Figure 10:
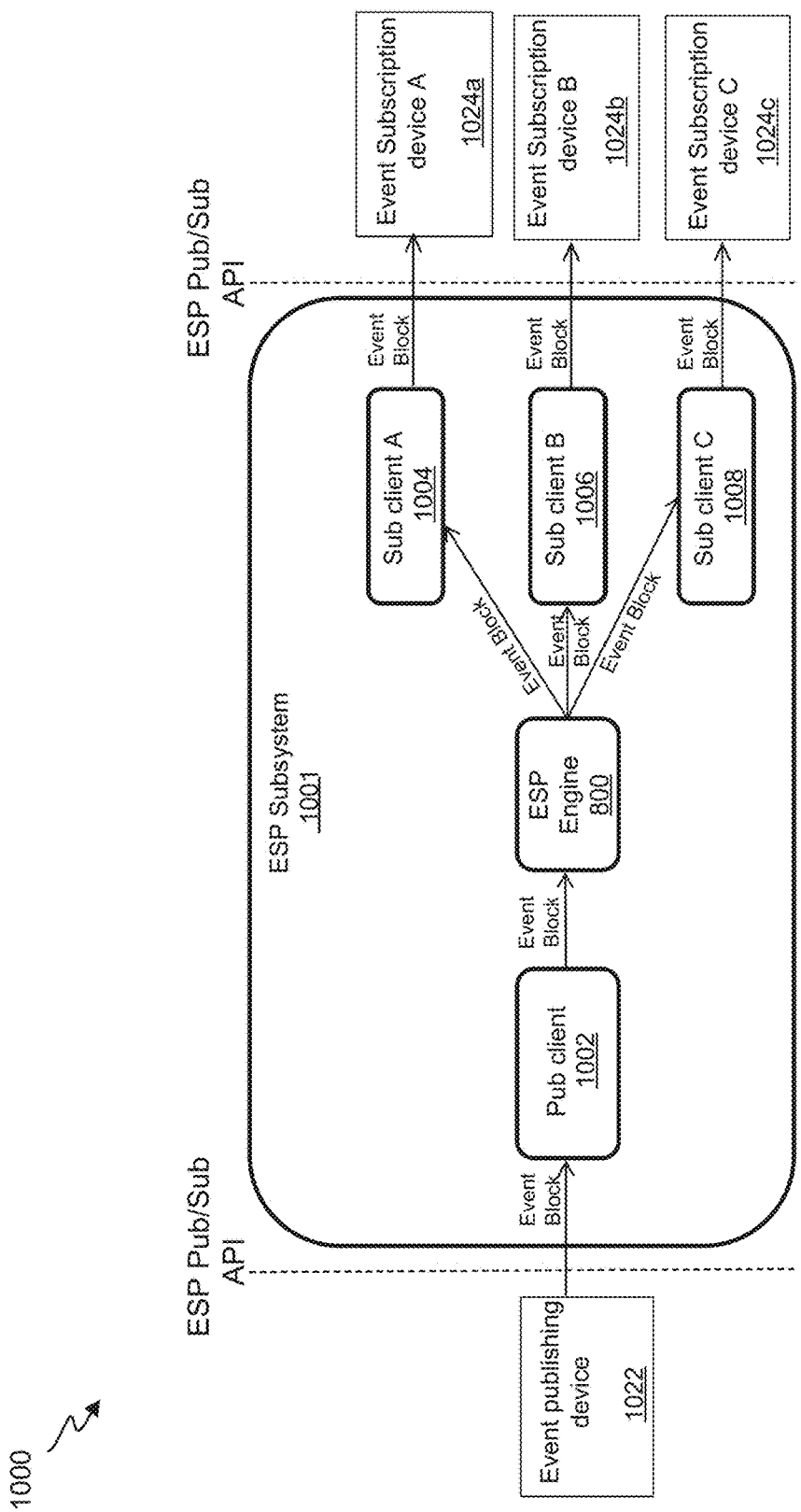
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
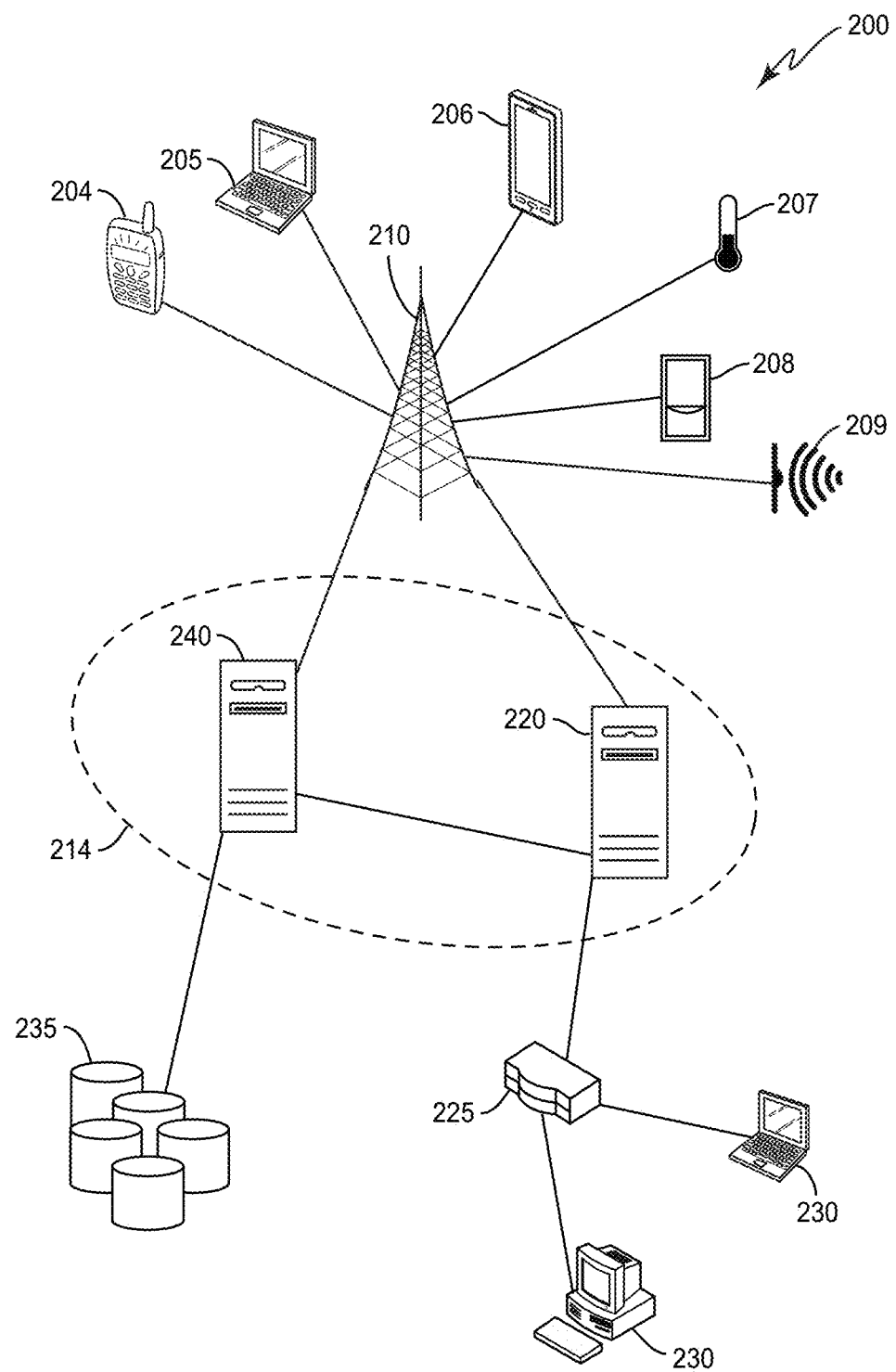
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
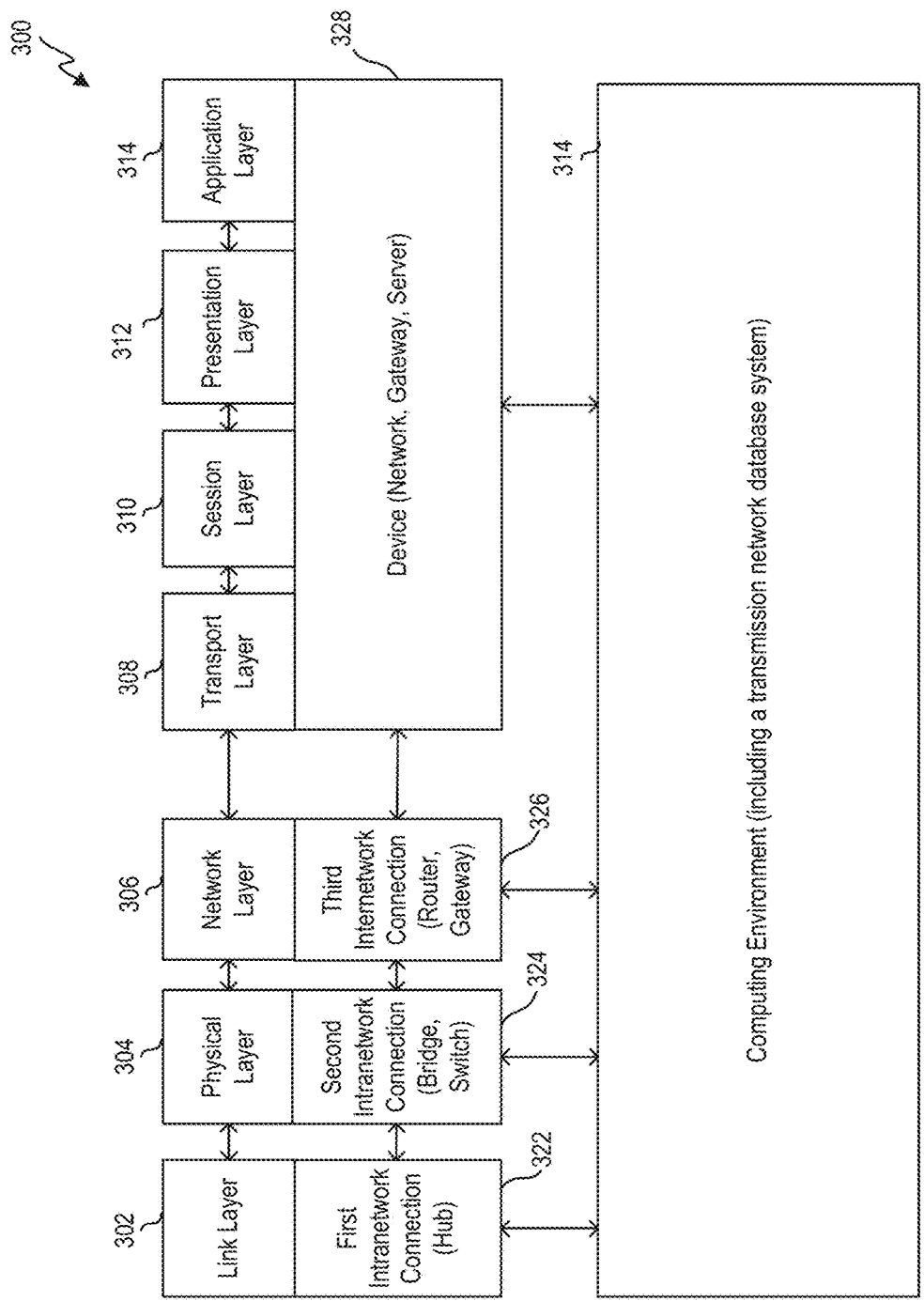
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
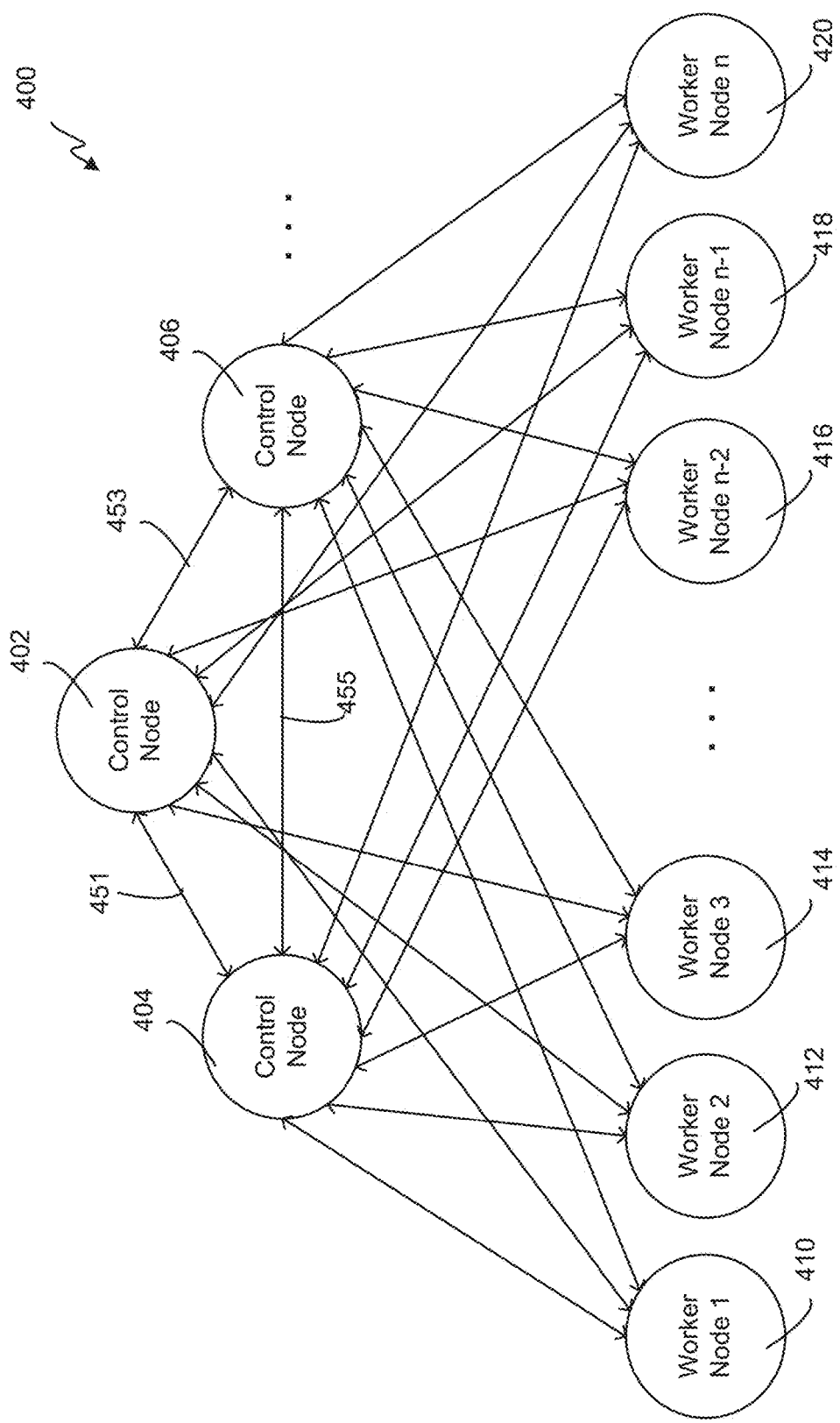
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
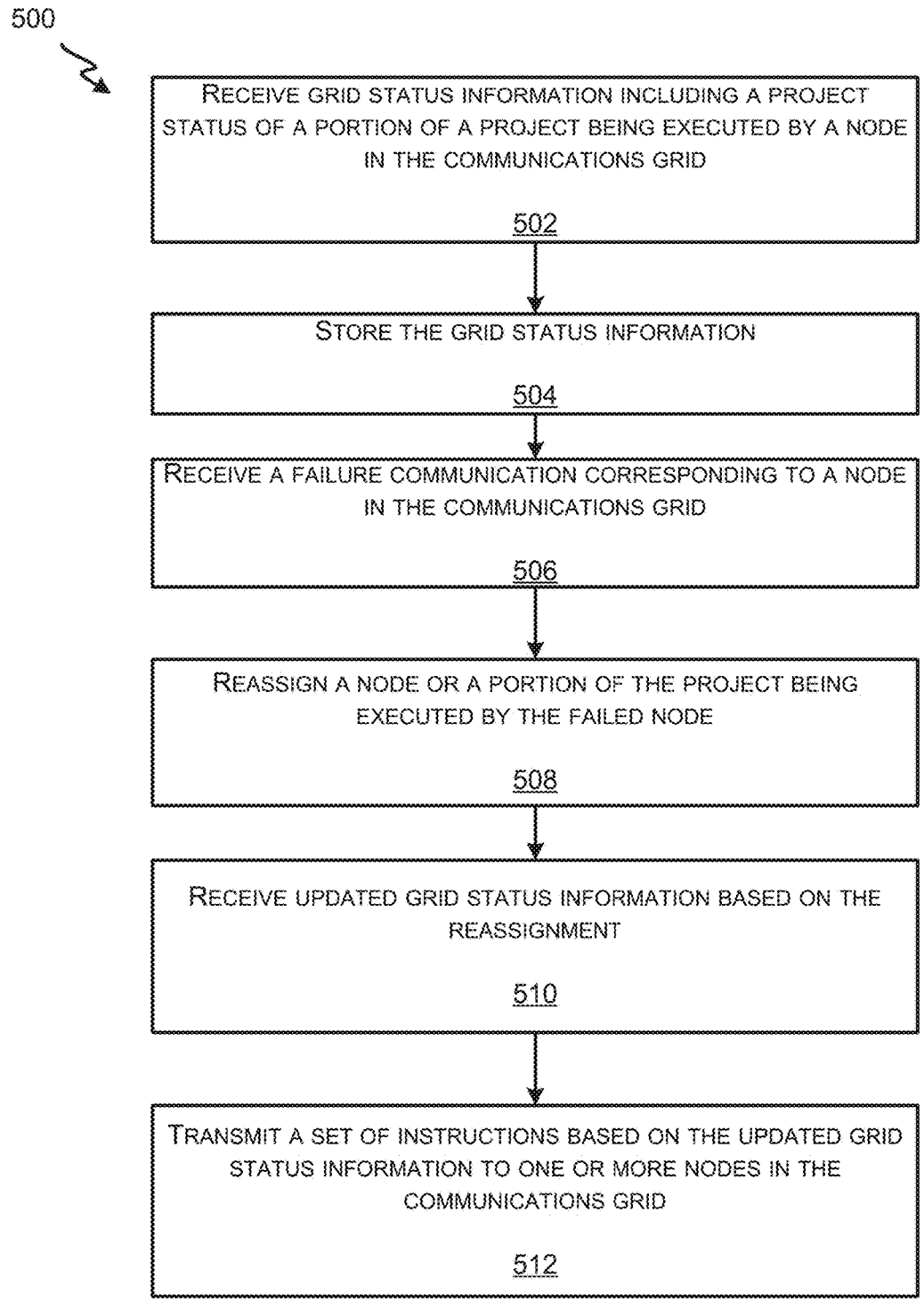
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
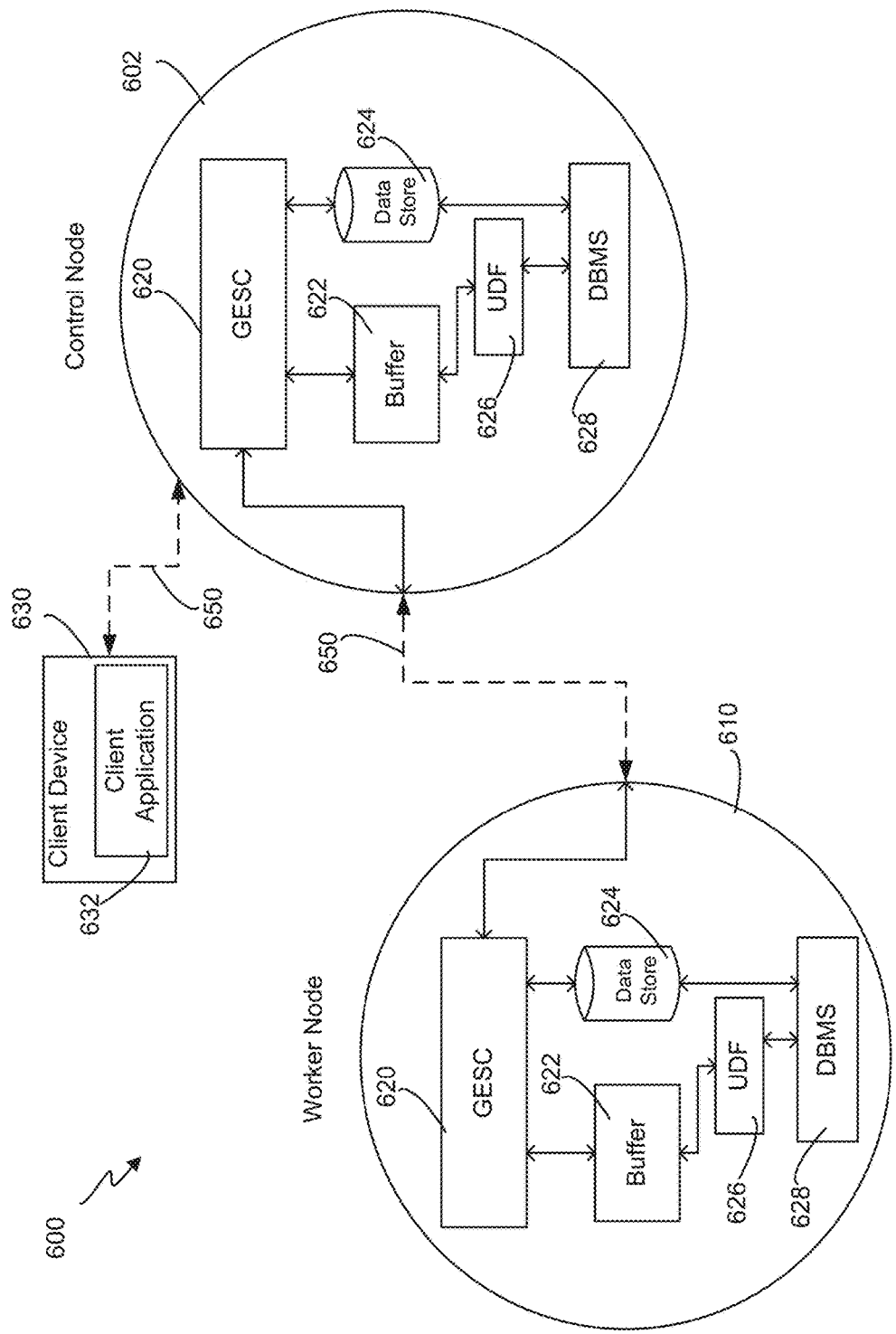
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
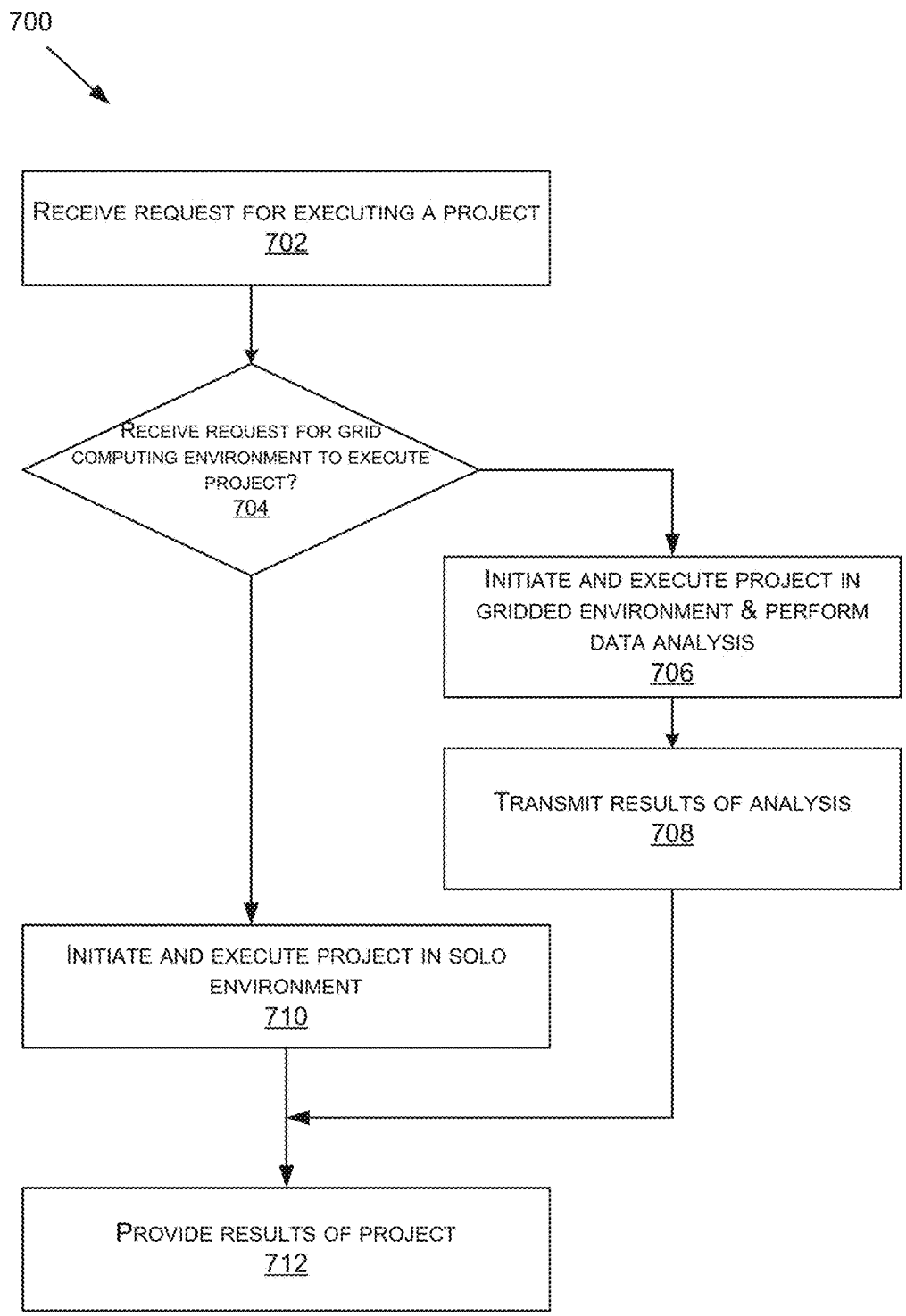
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a*-*c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
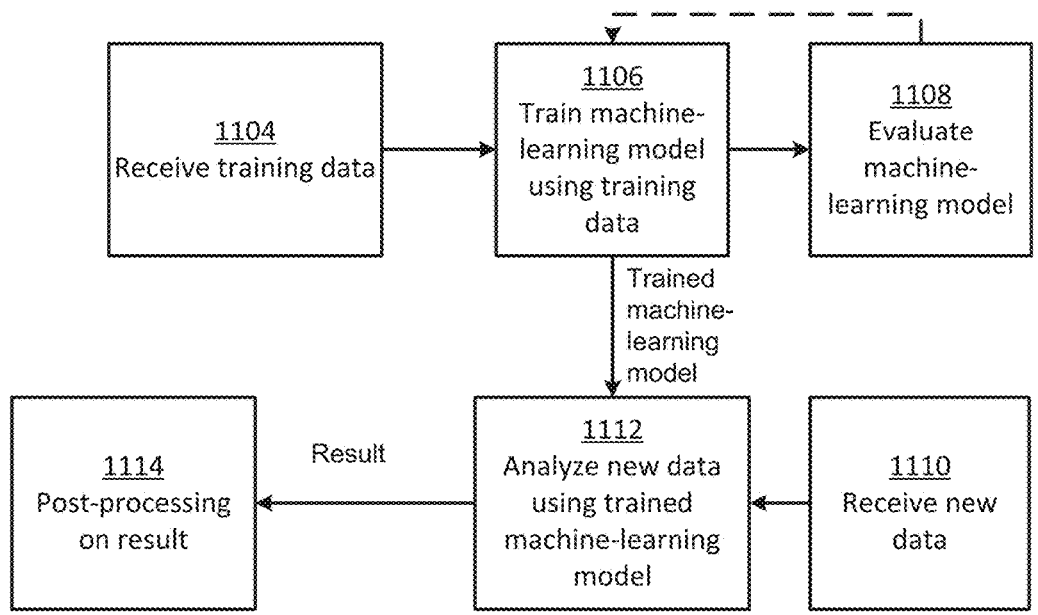
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS) 6, SAS Viya 6 of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
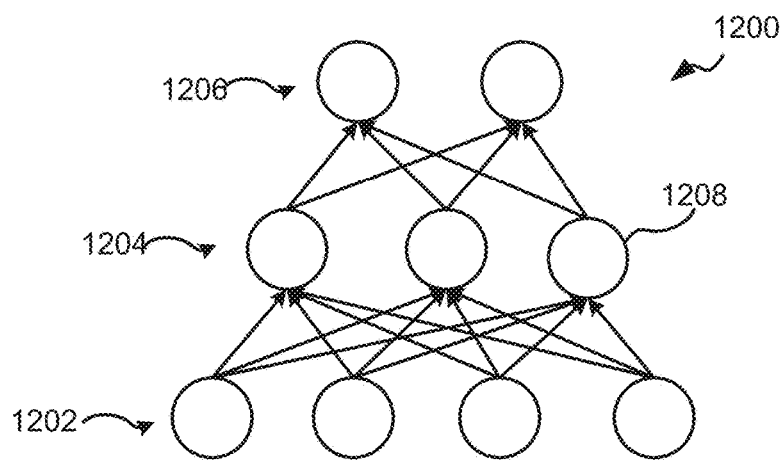
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
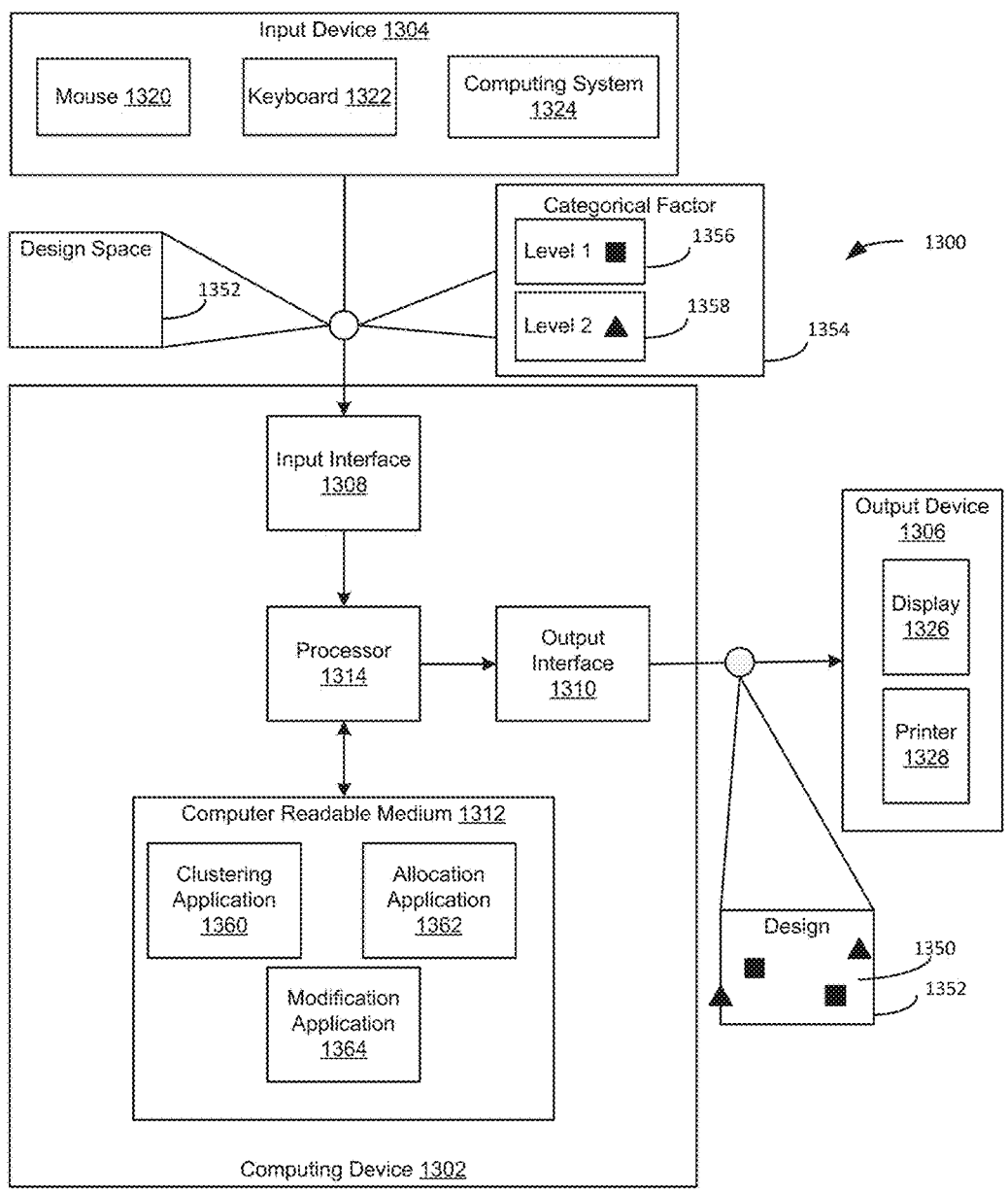
FIG. 13 illustrates a block diagram of a system in at least one embodiment of the present technology.

FIG. 13 shows a block diagram of a system 1300 in at least one embodiment of the present technology. The system 1300 includes a computing device 1302, an input device 1304, and an output device 1306. The system is configured to exchange information between the computing device 1302 and input device 1304 and between the computing device 1302 and output device 1306 (e.g., via wired and/or wireless transmission). For example, a network (not shown) can connect one or more devices of system 1300 to one or more other devices of system 1300. In one or more embodiments, the system 1300 is useful for outputting to output device 1306 a design 1350 to output device 1306 for a design space 1352. In some embodiments, the output device 1306 may be one or more of a display device 1326, a printer 1328 or another device not shown (e.g., storage device or buffer).

Computing device 1302 includes an input interface 1308, an output interface 1310, a computer-readable medium 1312, and a processor 1314. In other embodiments, fewer, different, and additional components can be incorporated into computing device 1302.

The computing device 1302 receives information from input device 1304 via input interface 1308. For instance, as shown in FIG. 13 the information received by input interface 1308 includes information describing, representing or defining design space 1352 (e.g., a boundary for design space 1352). Alternatively or additionally, the information received by input interface 1308 includes information describing, representing, or defining a categorical factor 1354 for the design space. A categorical factor describes a design option at a design point for a design space. A categorical factor can have different design options represented by a level (e.g., a first level 1356 and a second level 1358). Of course categorical factor 1354 can have other levels not shown in FIG. 13. In other embodiments, multiple categorical factors could be received by input interface 1308 for the design space 1352, with one or more levels for each of the categorical factors.

In one or more embodiments, the input device 1304 is one or more devices for user entry (e.g., entry of a formula to define the boundary of the design space 1352) into the system 1300. For instance, the input device 1304 could include one or more of a mouse 1320 or a keyboard 1322. Alternatively or additionally, the input device 1304 includes a display, a track ball, a keypad, one or more buttons, a sensor, a phone, etc. Input interface 1308 in the same or different embodiments further provides an interface for receiving information from another device or machine such as a computing system 1324.

The computing device 1302 outputs information to output device 1306 via output interface 1310. Output interface 1310 provides an interface for outputting information (e.g., information representing design 1350) for review by a user and/or for use by another application or device or multiple applications or devices. For example, output interface 1310 interfaces with various output technologies including, but not limited to, display 1326 and a printer 1328. In the same or different embodiments, output interface 1310 with a device for data storage of output information.

In an alternative embodiment, the same interface supports both input interface 1308 and output interface 1310. For example, a touch screen provides a mechanism for user input and for presentation of output to the user. Alternatively, the input interface 1308 has more than one input interface that uses the same or different interface technology. Alternatively or additionally, the output interface 1310 has more than one output interface that uses the same or different interface technology.

Computer-readable medium 1312 is an electronic holding place or storage for information so the information can be accessed by processor. Computer-readable medium 208 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1314 executes instructions (e.g., stored at the computer readable medium 1312). The instructions can be carried out by a special purpose computer, logic circuits, or hardware circuits. In one or more embodiments, processor 1314 is implemented in hardware and/or firmware. Processor 1314 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1314 operably couples with input interface 1308, with output interface 1310 and with computer readable medium 1312 to receive, to send, and to process information. Processor 1314 in one or more embodiments can retrieve a set of instructions from a permanent memory device and copy the instructions in an executable form to a temporary memory device that is generally some form of RAM.

In one or more embodiments computer-readable medium 1312 stores instructions for execution by processor 1314. For example, computer-readable medium 1312 could comprise instructions for a clustering application 1360 for forming clusters of potential design points in the design space 1352, allocation application 1362 for allocating levels assigned to categorical factors in the design space, and modification application 1364 for modifying design points in the design space. In other embodiments, fewer, different, or additional applications can be stored in computer-readable medium 1312. For instance, applications could be stored to generate information, relevant to the designs space 1352 or categorical factor 1354 rather than or in addition to receiving information from input device 1304.

In one or more embodiments, one or more applications stored on computer-readable medium 1312 are implemented in software (e.g., computer-readable and/or computer-executable instructions) stored in computer-readable medium 1312 and accessible by processor 1314 for execution of the instructions. The applications can be written using one or more programming languages, assembly languages, scripting languages, etc. The one or more application can be integrated with other analytic tools. In one example, clustering application 1360, allocation application 1362, and modification application 1364 are integrated data analytics software application and/or software architecture such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

One or more applications stored on computer-readable medium 1312 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

The design 1350 has continuous variables for the design space 1352 represented graphically as the two-dimensions of the design 1350 and can have one or more categorical factors for the design space, represented graphically by the levels 1356 and 1358 distributed in the design 1350. Factors and variables are used interchangeably herein. In one or more examples, a categorical factor has different levels that represent discrete values or options for the design space in contrast to a continuous variable that describes a range of possible values or options. The range can be infinite (e.g., taking on infinite values in a bounded dimension by the constraints of an experiment such as the total length, width, or height of an object for an experiment).

In one or more embodiments, the system 1300 implements a method as described herein (e.g., a method shown in FIGS. 14A-14B, 15 and 17) for outputting or storing a design (e.g., design 1350).

Figure 14A:
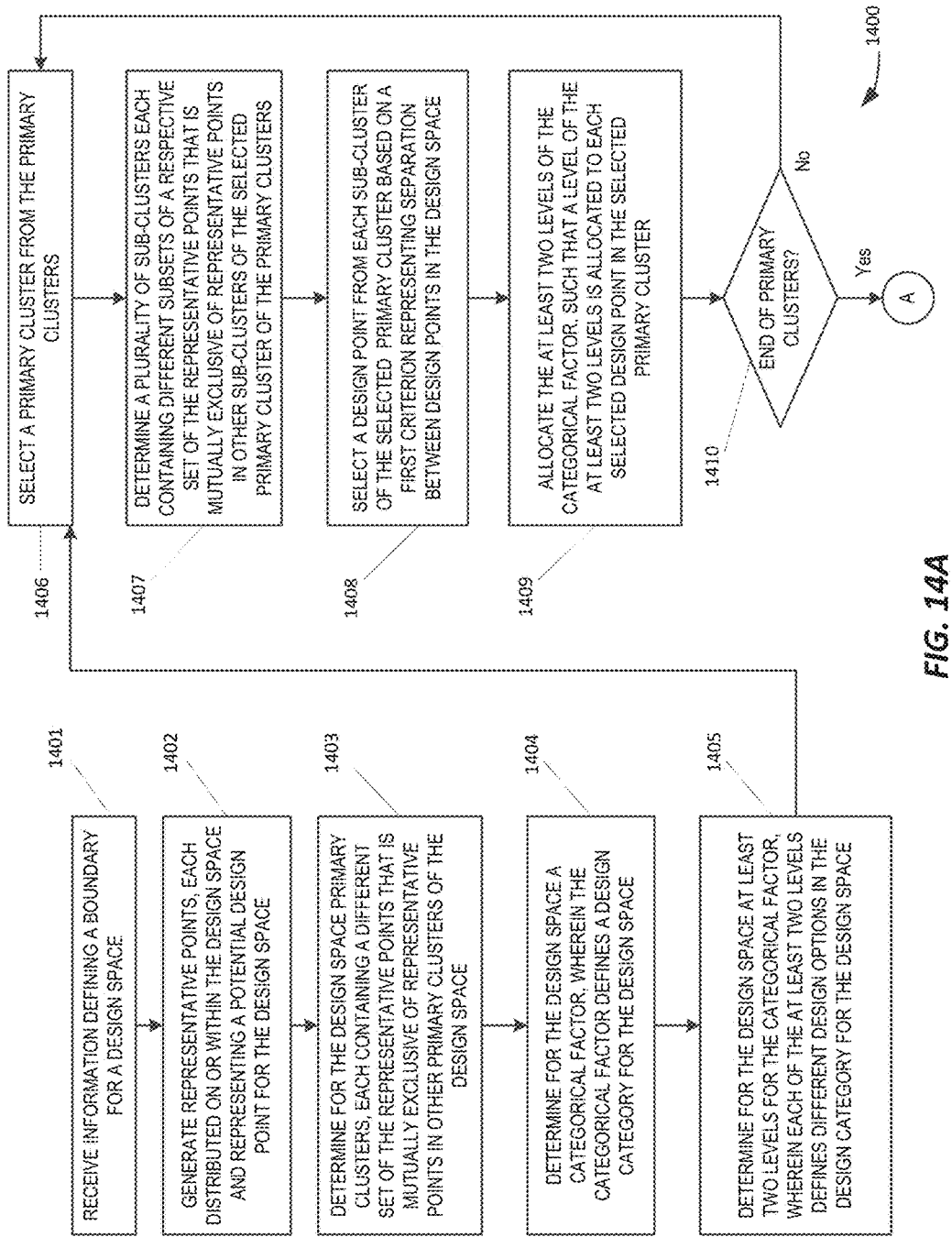
FIGS. 14A-14B illustrate a flow diagram in at least one embodiment of the present technology.
Figure 14B:
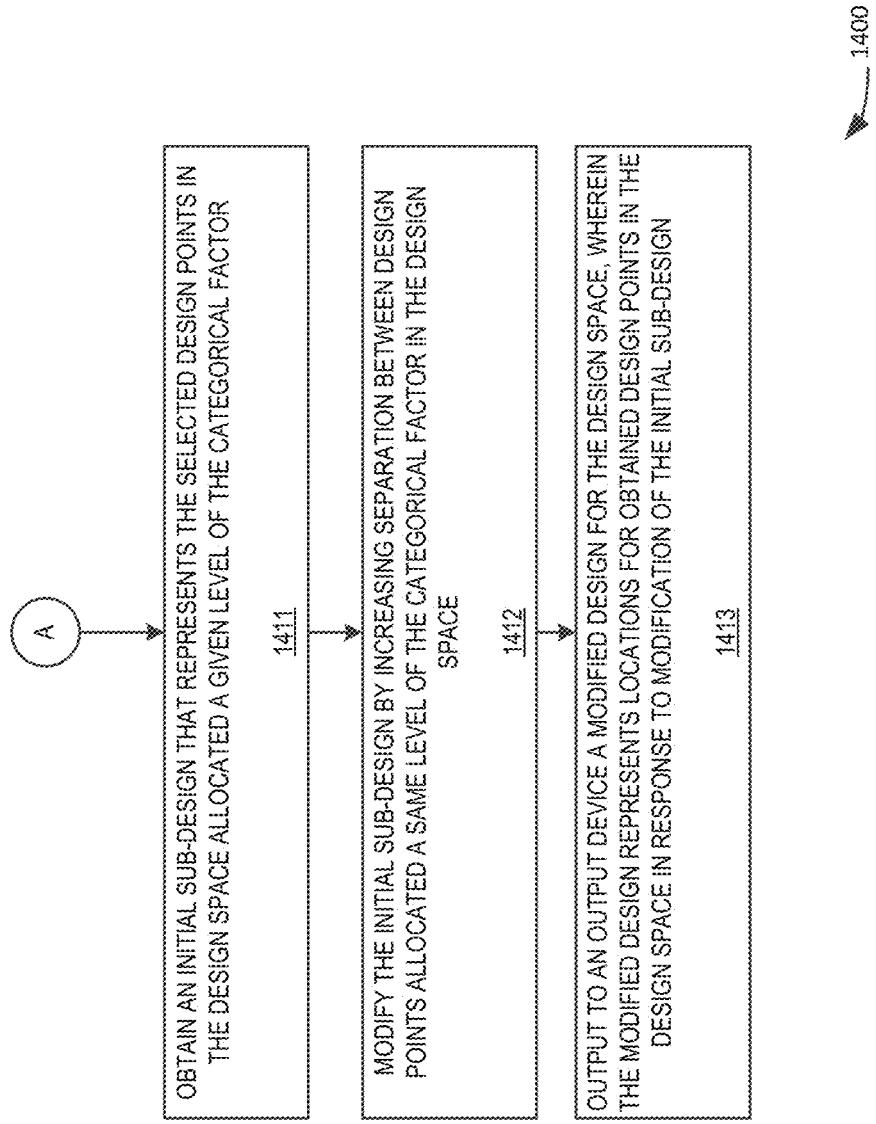

FIGS. 14A-14B illustrates a flow diagram for a computer-implemented method 1400 that can be used to select design points in various design space. For example, the method 1400 could be used to select design points in design space 1352 of FIG. 13, design space 1600 of FIGS. 16A-J, or design space 1800 of FIGS. 18A-F. The method 1400 of FIG. 14A will be described with reference to FIGS. 16A-J as an example implementation of method 1400.

The method 1400 illustrates an operation 1401 in which information defining a boundary for a design space (e.g., design space 1600) is received (e.g., at computing device 1302 of FIG. 13). Information defining a boundary for a design space could explicitly or implicitly define the boundary or define all or a portion of the boundary. For example, the information could be one or more formula explicitly defining all or a portion of the points on the boundary of a design space. In another example, the information could include information about the design space for implicitly defining the boundary (e.g., a shape of the design space, such as a rectangle, a length of a side of the design space and/or a total volume of the design space). More example embodiments of information defining a boundary for a design space are defined herein.

Figure 16A:
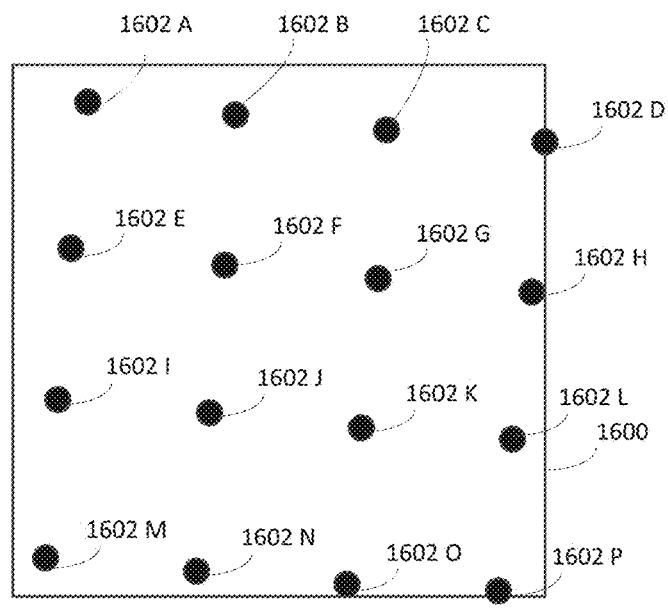
FIGS. 16A-16J illustrate a block diagram of design point selection in at least one embodiment involving level swapping.

In an operation 1402, representative points are generated (e.g., 1602 A-P) as illustrated in FIG. 16A. Each representative point is distributed on and/or within the design space and represents a potential design point for the design space. In one or more embodiments, the representative points may be distributed randomly in the design space.

In operations 1403-1405 various features or properties are determined for the design space. For instance, representative points can be assigned or otherwise placed in one or more groups, which can be denoted as clusters. One of ordinary skill in the art will appreciate that these operations could be performed in any order or could be performed earlier in the method 1400.

Figure 16B:
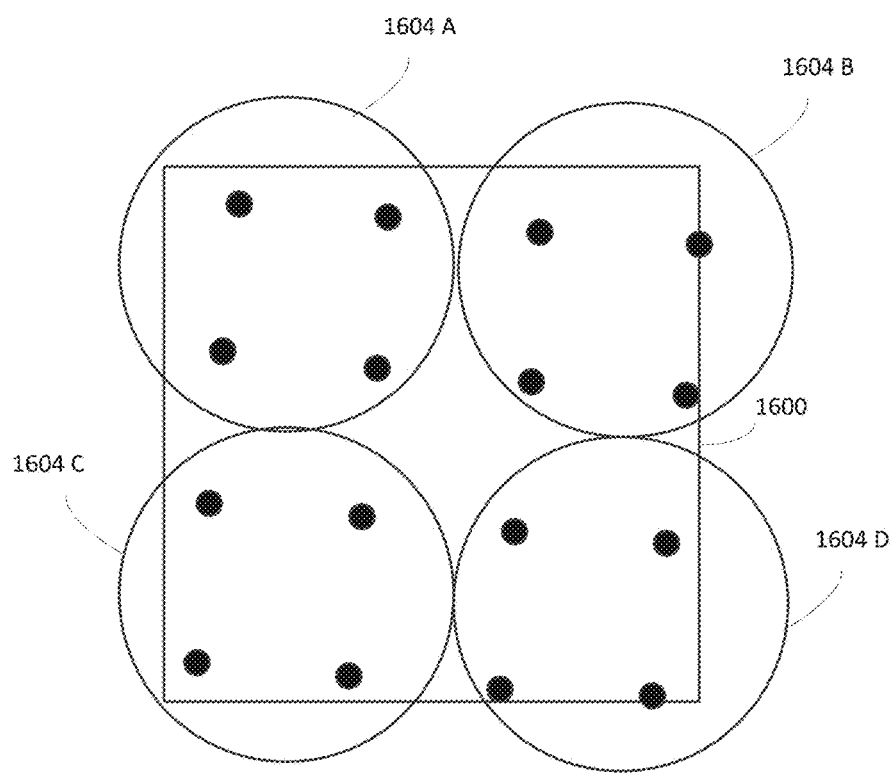

In an operation 1403, primary clusters are determined. The primary clusters are each groups of the representative points (e.g., each primary cluster contains a different set of the representative points). For instance, as described in operation 1403, the different sets of representative points may be different because they are mutually exclusive of representative points in other primary clusters of the design space. FIG. 16B shows as an example the representative points 1602A-P of design space 1600 grouped into four primary clusters 1604A-D with different sets of representative points that are mutually exclusive. Of course, the representative points could be grouped differently (e.g., in different amounts of primary clusters and/or with different numbers of representative points). These clusters are referred to as primary clusters in this example method 1400 and in other embodiments herein only for ease of explanation. Of course, one of ordinary skill in the art will appreciate that the primary clusters could be referred to differently. Further, these primary clusters are the first grouping in method 1400. However, representative points could have been grouped previously (e.g., a design space could itself be defined by a cluster of representative points) or a design space could have additional or different clustering defined for representative points in a design space.

In an operation 1404, a categorical factor for the design space is determined. As explained above, a categorical factor has different levels that represent discrete values or options for the design space. The determined categorical factor defines a design category for the design space, which means that the discrete values or options will be within this design category. For instance, in the background example of a bottle, a design category could be material types for the bottle, with different options including glass, metal, ceramic, and/or plastic. Method 1400 is described with reference to a single categorical factor as an example, but one of ordinary skill in the art will appreciate that in other embodiments additional categorical factors are determined. More examples of categorical factors will be described in the context of other example embodiments below.

In one or more embodiments, a categorical factor is already input or otherwise generated for the design space and determining the categorical factor includes determining it for an operation in the method 1400. In one or more embodiments, a categorical factor is determined, input or otherwise generated earlier in method 1400. For example, the number of categorical factors and/or the number of levels for the categorical factors can be used to determine a total number of primary clusters determined in 1403. Alternatively, in other embodiments, the categorical factor is determined, input, or otherwise generated later in method 1400, e.g., for operations of method 1400 described below.

In an operation 1405, at least two levels for the categorical factor for the design space are determined. Each of the levels defines different design options in the design category for the design space. As explained above if the categorical factor is a material type for a bottle, one level could be plastic and another level could be glass. More examples of levels will be described in the context of other example embodiments below. In one or more embodiments, a level for a categorical factor is already input or otherwise generated for the design space and determining the level includes determining it for an operation in the method 1400. In one or more embodiments, a level is determined, input or otherwise generated earlier in method 1400. Alternatively, in other embodiments, the level is determined, input, or otherwise generated later in method 1400, e.g., for operations of method 1400 described below.

In one or more embodiments, the representative points are greater than the number of desired design points for the design space. Operations 1406-1410 describe a series of operations for each of respective or selected primary cluster of the primary clusters to select the design points in the design space out of the representative points.

Figure 16C:
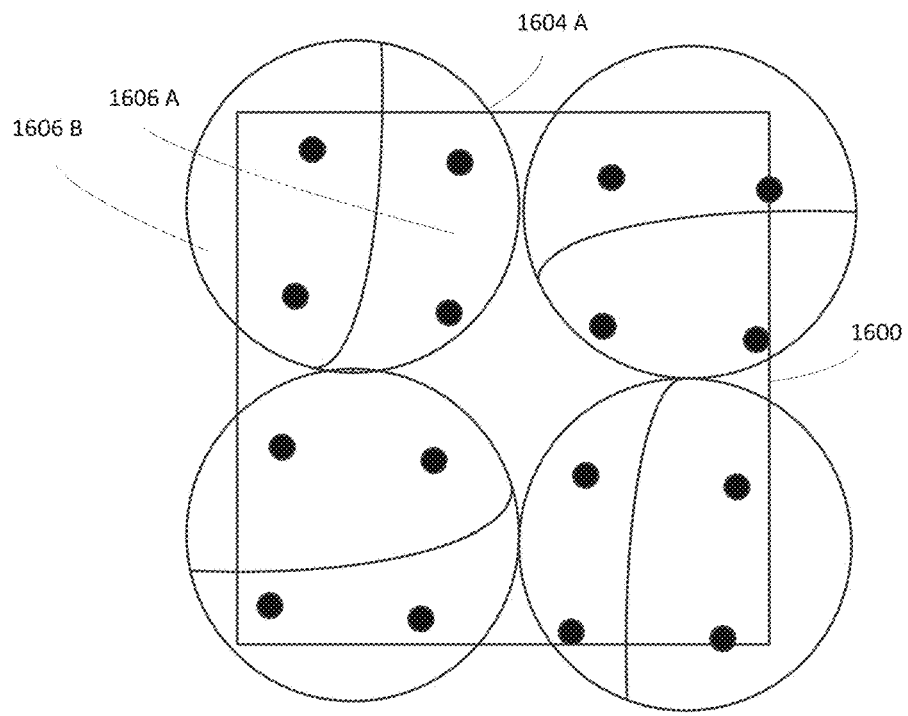

In operation 1406, a primary cluster from the primary clusters is selected. In operation 1407, a plurality of sub-clusters containing different subsets of a respective set of the representative points is determined. For instance, as described in operation 1407, the different sets of representative points are different because they are mutually exclusive of representative points in other sub-clusters of a selected primary cluster of the primary clusters. For example, as shown in FIG. 16C, primary cluster 1604A has sub-clusters 1606A and 1606B. In one or more embodiments, the total number of sub-clusters within a primary cluster is the maximum number of levels for any of the categorical factors defined for the design space.

Figure 16D:
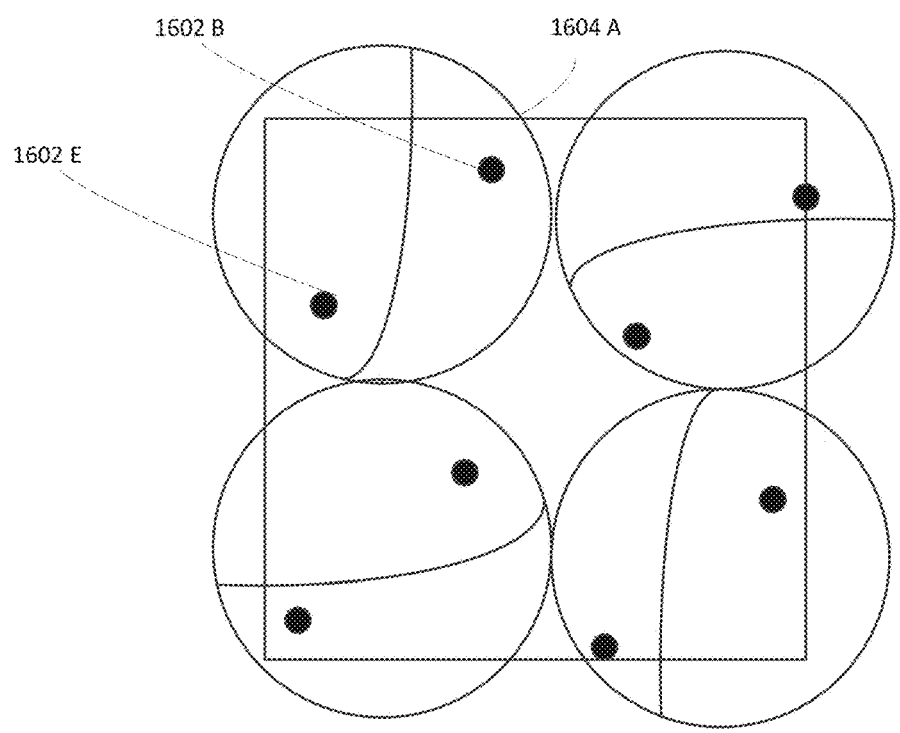

In operation 1408, a design point is selected from each sub-cluster of the selected primary cluster based on a first criterion representing separation distance between design points in the design space. For example, as shown in FIG. 16D, representative points 1602B and 1602E are selected as the design points for sub-clusters 1606A and 1606B, respectively of cluster 1604A. One example of a first criterion representing separation between design points is a centroid criterion, which places a design point at the center of each sub-cluster. Another example of a first criterion is a MaxPro criterion (this will be explained in more detail later in the application) that finds a design point in a sub-cluster that minimizes the MaxPro Criterion.

Figure 16E:
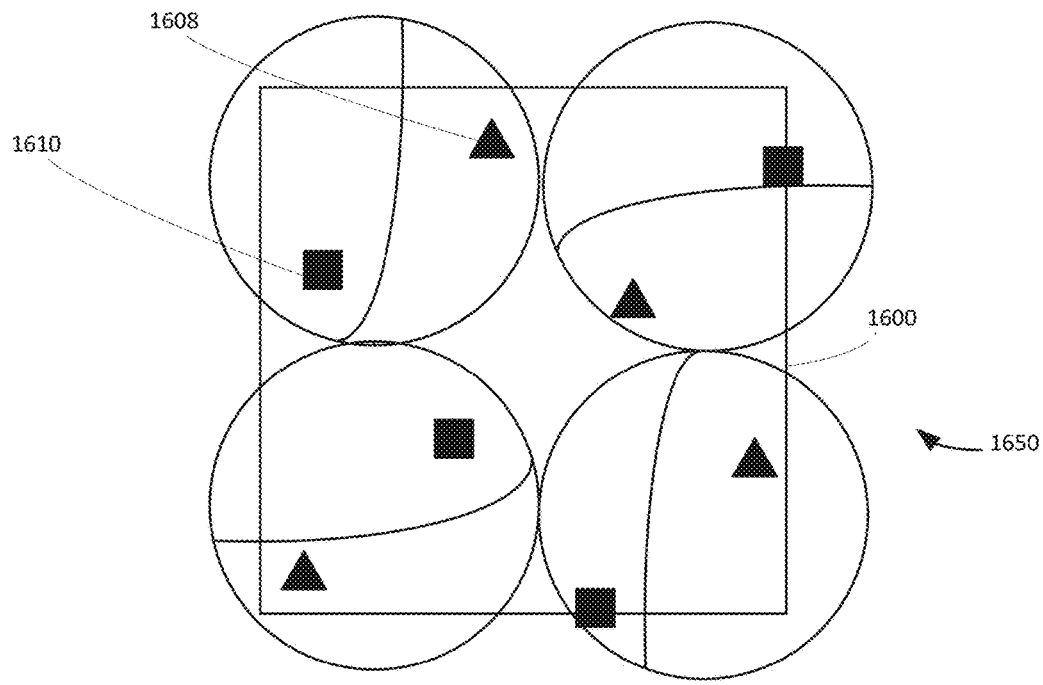

In operation 1409, the levels of the categorical factor are allocated to each selected design point in the selected primary cluster. For example, as shown in FIG. 16E there is a first level 1608 (represented by a triangle) assigned to design point 1602B and a second level 1610 (represented by a square) assigned to design point 1602E.

Operation 1410 is used to determine whether there are more primary clusters remaining for completing the operations 1406-1409. If there are still remaining primary clusters, the method returns to operation 1406 to select a different primary cluster of the remaining primary clusters. If the operations reach the end of the primary clusters, the method precedes as shown in FIG. 14B. If there are k primary clusters and m sub-clusters, the operations should produce km design points.

The initial allocation of the levels to the design points of the primary cluster can be random. The use of random assignment means that design points with the same level for a categorical factor can end up too close to each other than would be desired.

FIG. 14B shows a method for modifying a sub-design of a level for a categorical factor to improve the separation distance between design points with the same level for a categorical factor.

As shown in FIG. 14B, in operation 1411, an initial sub-design that represents the selected design points in the design space allocated a given level of the categorical factor is obtained. In operation 1412, the initial sub-design is modified by increasing the separation distance between design points allocated a same level of the categorical factor in the design space. For example, the modification could involve level swapping, which is described in more detail in reference to FIGS. 15 and 16A-J. Alternatively, or additionally the modification could involve design point replacement, which is described in more detail in reference to FIGS. 17 and 18A-F. In operation 1413, a modified design for the design space is output. The modified design represents locations for obtained design points in the design space in response to modification of the initial sub-design.

The method 1400 can be carried out by system 1300 or other systems not shown. In one or more embodiments involving methods described herein, additional, fewer, or different operations can be performed depending on the embodiment. For instance, the method 1400 could include receiving (e.g., via user input) one or more categorical factors for the design space before operation 1401 or later in the method 1400 (e.g., prior to operation 1407).

Although some of the operational flows in methods described herein are presented in sequence, the various operations may be performed in various repetitions, concurrently (in parallel, for example, using threads and/or a distributed computing system) and/or in other orders than those that are illustrated. For example, operation 1404 could occur before operation 1402.

Figure 15:
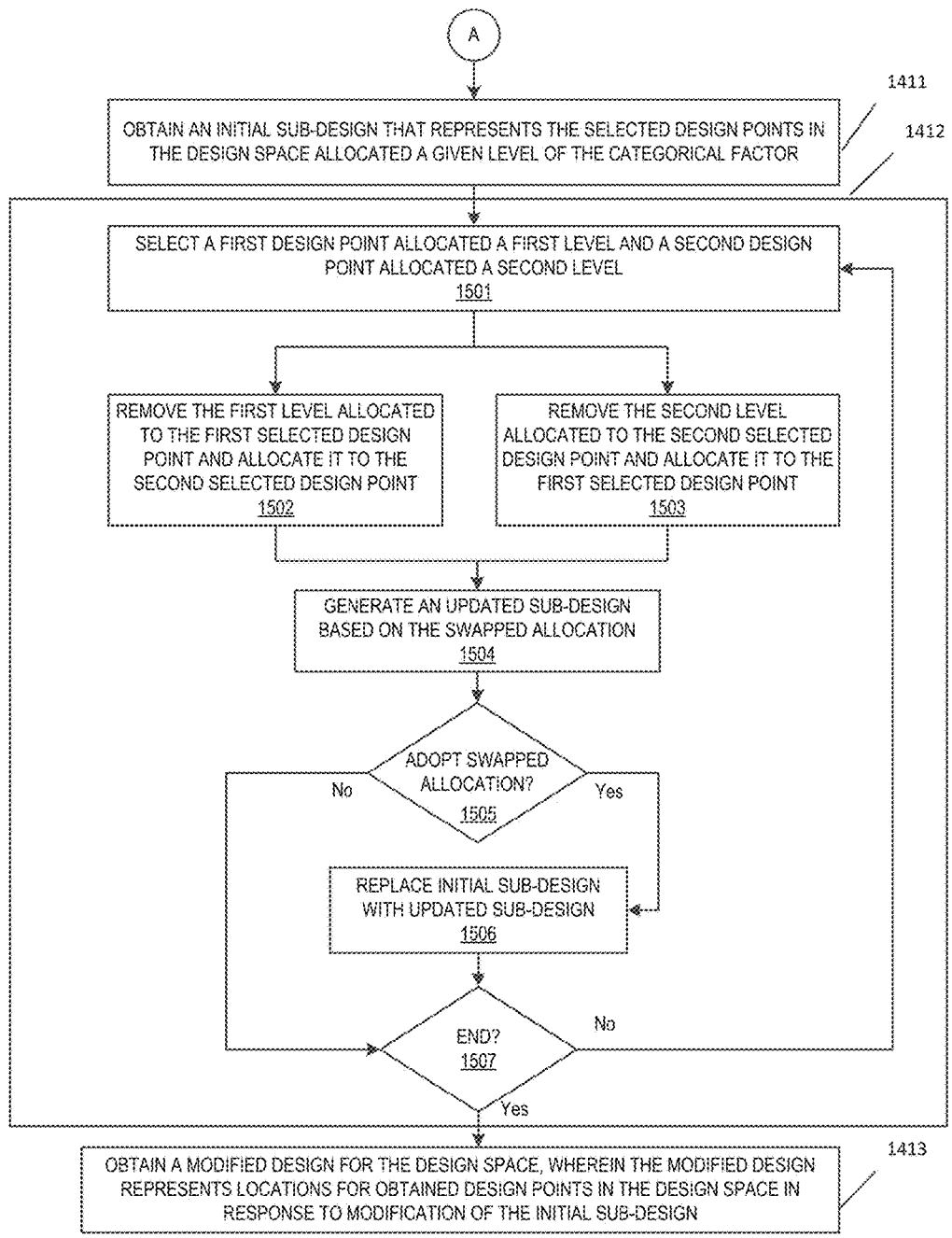
FIG. 15 illustrates a flow diagram in at least one embodiment involving level swapping.

FIG. 14A and FIG. 15 illustrate a flow diagram of a method 1400 in at least one embodiment involving level swapping. As shown in FIG. 15, the operation 1412 can involve a series of operations for modifying an initial sub-design by swapping a first level allocated to a first selected design point and a second level allocated to a second selected design point of a primary cluster of the design space. Level swapping then, for instance, involves replacing the first level allocated to the first selected design point and allocating it to the second selected design point; and replacing the second level allocated to the second selected design point and allocating it to the first selected design point. Level swapping can be considered modifying, switching, replacing, or otherwise changing a level associated with a design point.

As shown in FIG. 15, operation 1501 involves selecting candidate design points for level swapping, i.e., a first design point allocated a first level and a second design point allocated a second level. Operations 1502 and 1503 involve swapping the levels by removing the first level allocated to the first selected design point and allocating it to the second selected design point (1502), and removing the second level allocated to the second selected design point and allocating it to the first selected design point (1503). As shown the operations could occur in parallel or alternatively sequentially. In operation 1504, an updated sub-design is generated based on the swapped allocation. A choice is made in operation 1505 as to whether to adopt the swapped allocation, and if so, replace the initial sub-design with the updated sub-design in operation 1506.

In operation 1507, a choice is made as to whether to end the process or continue picking candidate design points in the design space for level swapping. This choice can be automated or manual. For instance, in one or more embodiments, conditions are set to automatically decide when to end the process. In other embodiments, a user can manually stop the process (e.g., via user input).

Operations 1501-1507 could be used to find candidate design points in each primary cluster of the design space and to determine whether to change a level allocated to a design point of a sub-cluster of each of the primary clusters of the design space. A condition could be set to iterate a fixed number of times (e.g., 10 iterations) or through each primary cluster a fixed number of times.

Alternatively or additionally, a condition could be set to perform operations 1501-1507 until no improvement is found. In one embodiment, improvement is determined by determining an initial average representing separation of design points in the design space. For instance, for each of the levels of the categorical factor, computing an initial computed criterion representing the separation distance between design points allocated a same level in the design space to obtain a plurality of computed criterion, one for each of the levels of the categorical factor and then averaging the initial computed criterion.

In one or more embodiments, improvement is determined by comparing an updated average when levels are swapped to the initial average. For instance, the updated average is performed by determining a first candidate design point and a second candidate design point of selected design points of a primary cluster in the design space. A swapped allocation is obtained for the design space by replacing a level allocated to the first candidate design point for the categorical factor with a level allocated to the second candidate design point for the categorical factor. An updated sub-design is determined based on the swapped allocation. An updated average representing the separation of design points in the design space according to the swapped allocation is obtained. If a difference between the updated average and the initial average indicates, the updated sub-design achieves a greater separation of design points of a same level than the initial sub-design, the initial sub-design of the design space is modified by replacing the initial sub-design with the updated sub-design; and replacing the initial average with the updated average. In one or more embodiments, level-swapping advantageously allows improved modeling on a particular sub-design level. In one or more other embodiments, level swapping allows for improvement of the full design such that the updated design achieves a greater separation distance for a majority of selected design points in the design space even though it may diminish separation distance for some of the selected design points in the design space.

FIGS. 16A-16J illustrates a block diagram of design point selection in at least one embodiment involving level swapping (e.g., in the method 1400 described in FIG. 14A-14B and FIG. 15). As explained the method 1400 of FIG. 14A can be used to obtain a design for a design space (e.g., design 1650 shown in FIG. 16E). FIGS. 16F-16J show an example of level swapping by moving through each primary cluster of the design space 1600 to increase or improve the separation distance between design points allocated a same level of the categorical factor in the design space 1600.

Figure 16F:
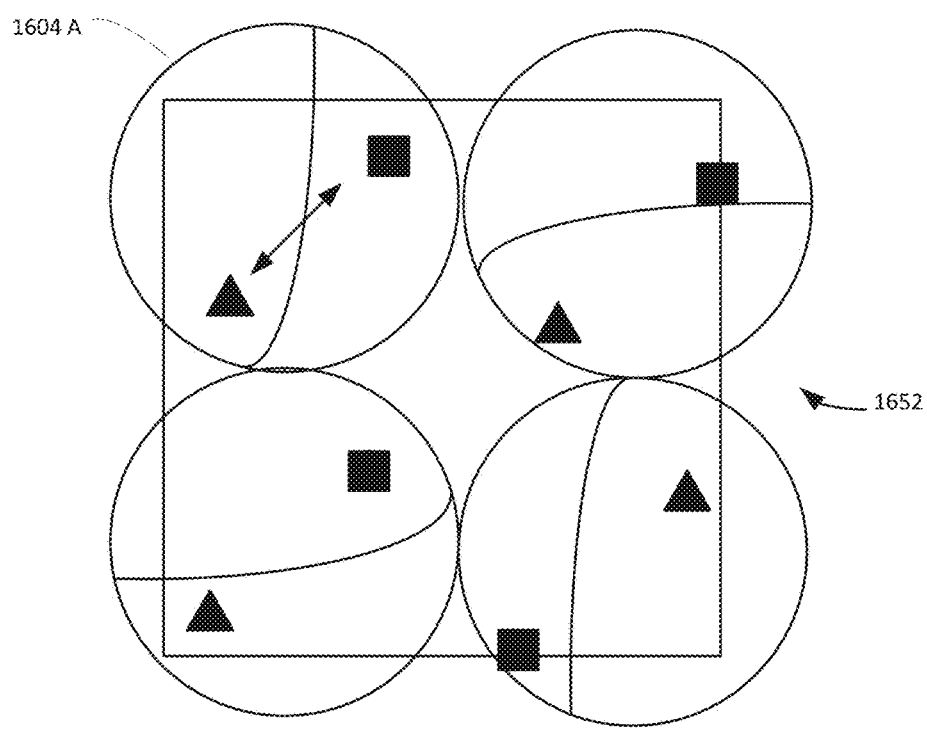
Figure 16G:
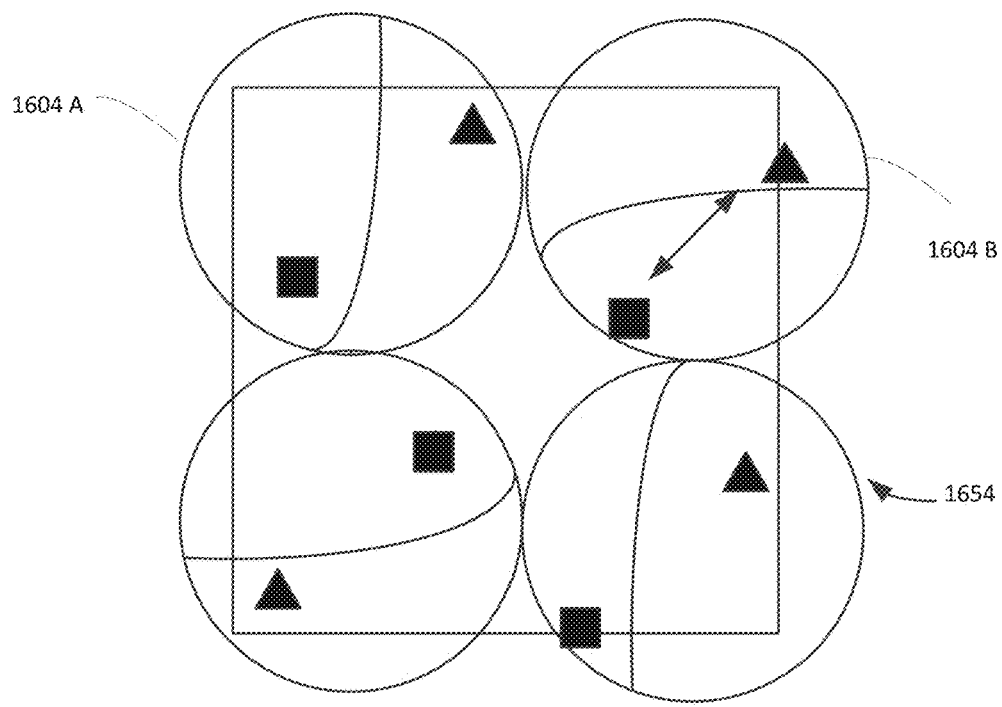

As shown in FIG. 16F, the levels allocated to the sub-clusters in cluster 1604A are swapped producing the swapped allocation 1652. FIG. 16G shows an example where it is determined that this swapped allocation 1652 did not improve the separation distance, so in FIG. 16G the swapped allocation 1654 shows that the levels in cluster 1604A have returned to their form in FIG. 16E and levels are swapped in cluster 1604B.

Figure 16H:
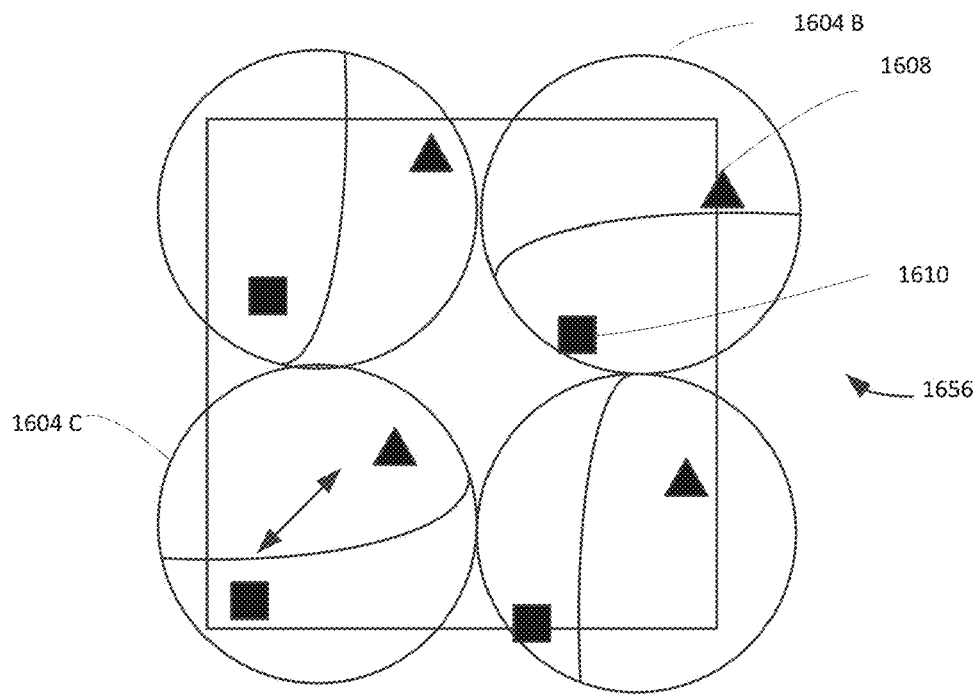

FIG. 16H shows an example where it is determined that the swapped allocation 1654 did improve the separation distance, so in FIG. 16H the swapped allocation 1656 shows that the levels in cluster 1604B have adopted the levels shown in FIG. 16G and levels are swapped in cluster 1604C.

This swapped allocation 1656 has resulted in a modification of two different sub-designs, one for level 1608 and one for level 1610.

Figure 16I:
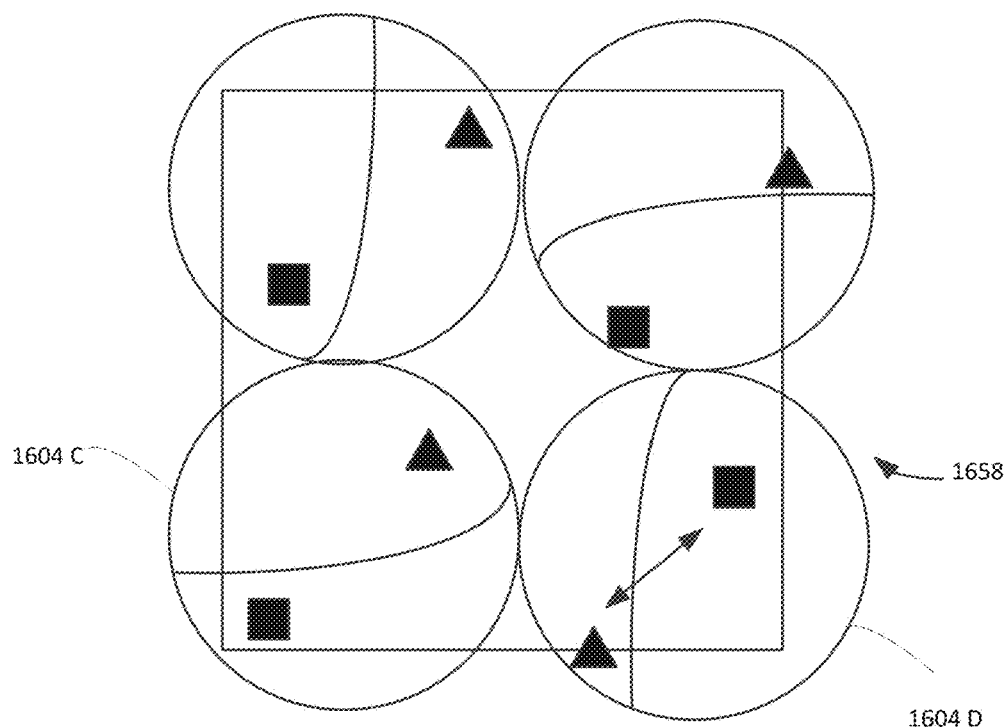

FIG. 16I shows an example where it is determined that the swapped allocation 1656 did improve the separation distance, so in FIG. 16I the swapped allocation 1658 shows that the levels in cluster 1604C have adopted the levels shown in FIG. 16H and levels are swapped in cluster 1604D.

Figure 16J:
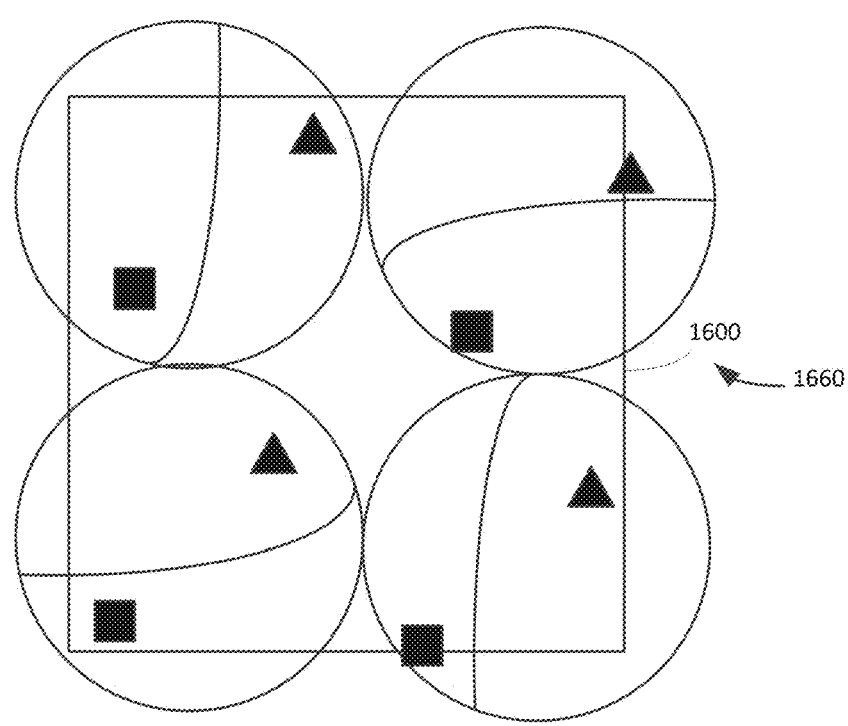

FIG. 16J shows a representation of an output modified design 1660 for the design space 1600. The modified design represents locations for obtained design points in the design space in response to modification of the initial sub-designs for level 1608 and level 1610.

Level swapping as described with reference to FIGS. 14A, 15, 16A-J is just one way to modify an initial sub-design by increasing separation between design points allocated a same level of the categorical factor in the design space. In one or more embodiments, it effectively concerns itself first with the space-fillingness of the overall design for the continuous factors, and then works on the sub-designs for each level of the categorical factors. Alternatively, or additionally the modification could involve design point replacement.

Figure 17:
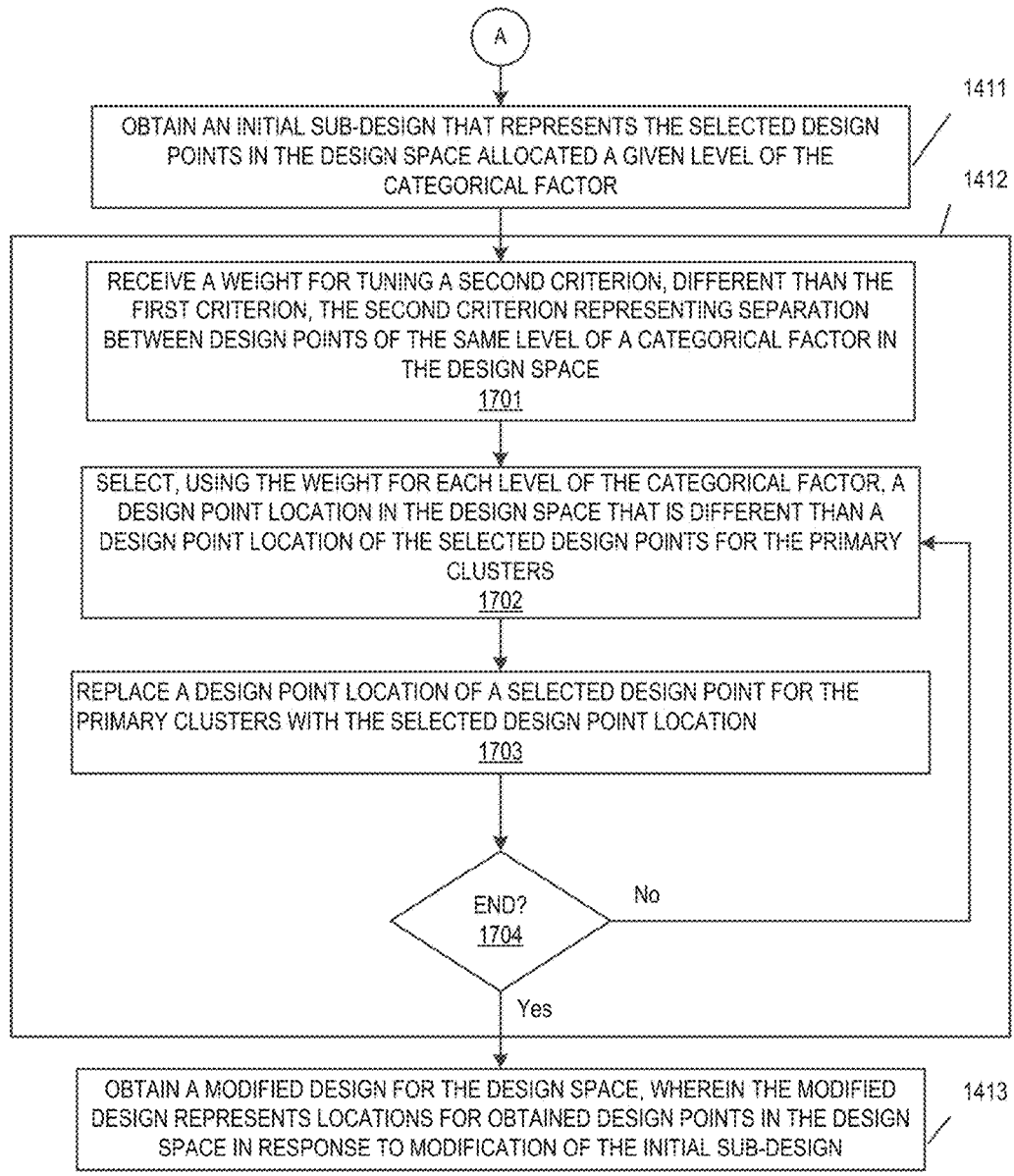
FIG. 17 illustrates a flow diagram in at least one embodiment involving design point replacement.

FIG. 17 illustrates a flow diagram of a method 1400 in at least one embodiment involving design point replacement. As shown in FIG. 17, the method 1400 can modify an initial sub-design from operation 1411 by, for a primary cluster, reselecting one or more design points of the representative points to replace corresponding ones of design points in the initial sub-design. In one or more embodiments, the design point replacement minimizes a second criterion representing the separation distance between design points allocated a given level. In one or more embodiments, the first and second criterion can be considered a distance metric because they represent the separation distance between design points.

In one or more embodiments, the second criterion is different than the first criterion in operation 1408. For example, the first criterion is a MaxPro criterion and the second criterion is a modified MaxPro criterion that accounts for a received weight.

In one or more embodiments, the MaxPro criterion is represented by:

$$\min_{D} \psi(D) = \left\{ \frac{1}{\binom{n}{2}} \sum_{i=1}^{n-1} \sum_{j=i+1}^{n} \frac{1}{\prod_{l=1}^{p}(x_{il} - x_{jl})^2} \right\}^{1/p}$$

where: $\psi(D)$ is the MaxPro criterion;

i, j, l are integer counters;

n is an integer number of primary clusters for the design space;

p is an integer number of continuous variables for the design space; and $x_{ab}$ is an entry in row a and column b of a matrix.

In one or more embodiments, the modified MaxPro criterion accounts for a received weight w and is represented by:

$$\min_{D} \psi(D)_w = \left\{ \frac{1}{\binom{n}{2}} \sum_{i=1}^{n-1} \sum_{j=i+1}^{n} \frac{I_w(c_i = c_j)}{\prod_{l=1}^{p}(x_{il} - x_{jl})^2} \right\}^{1/p}$$

where: $\psi(D)_w$ is the second criterion that is a modified MaxPro criterion;

i, j, l are integer counters;

n is an integer number of primary clusters for the design space;

p is an integer number of continuous variables for the design space;

$x_{ab}$ is an entry in row a and column b of a matrix; and $I_w(c_{d1}=c_{d2})$ is an indicator variable that is w if a categorical level $c_{d1}$ allocated to a design point d1 and a categorical level $c_{d2}$ allocated to a design point d2 are the same, and 1 otherwise.

In one or more embodiments, a matrix is used for either or both criterion to map the design space onto a matrix with rows and columns. For example, a row of a matrix represents a design point in the design space and the columns represents a value in a particular dimension for each of the design points. For example, if a design space is in a three dimensional space with points (0,0,0), (0,1,0), and (1,1,1), the matrix X could be represented as:

$$X = \begin{bmatrix} 0 & 0 & 0 \\ 0 & 1 & 0 \\ 1 & 1 & 1 \end{bmatrix}$$

Of course, one of ordinary skill in the art will appreciate that the rows and columns for the matrix X can be reversed and that other criterion can be used for the first and second criterion (e.g., a centroid approach can be used for the first criterion). Furthermore, the matrix may have various dimensions.

In operation 1701, a weight is received for tuning the second criterion (e.g., a modified MaxPro criterion as described herein).

In operation 1702, using the received weight, for each level of the categorical factor, a design point location is selected in the design space that is different than a design point location of the selected design points for the primary clusters.

In operation 1703, a design point location of a selected design point for the primary clusters is replaced with the selected design point location.

In operation 1704, a choice is made as to whether to end the process or continue picking candidate design points in the design space for design point replacement. This choice can be automated or manual. For instance, in one or more embodiments, conditions are set to automatically decide when to end the process. For instance, operations 1702-1704 could be used to find candidate design points in each primary cluster of the design space and to determine whether to select a replacement design point location for a design point in a selected primary cluster that increases the separation distance between design points allocated a level of the categorical factor in the design space. A condition could be set to iterate a fixed number of times (e.g., 10 iterations) or through each primary cluster a fixed number of times. Alternatively or additionally, a condition could be set to perform operations 1702-1704 until no improvement is found as explained herein.

The MaxPro criterion for operation 1408 when considering the continuous factors has advantageous over other criterion including (1) that points are non-collapsing (no replication of points in lower dimensions); (2) the criterion forces points apart in each dimension because of the $(x_{i1}-x_{j1})^2$ term in the denominator; (3) the criterion has good lower-order projections across dimensions; and (4) faster computation.

Assuming a MaxPro criterion, the design when looking at just the continuous factors should ideally have a small MaxPro value and for each level of a categorical factor, the sub-design for the continuous factors should have a small MaxPro value.

From a practical standpoint, if a categorical factor is included, it is not uncommon that the categorical factor is of particular interest. For the approach described with level swapping, the emphasis is firstly on the overall space-fillingness of the continuous factors. However, when emphasis should be placed on the categorical factors, a practitioner is also concerned that sub-designs on each level be as space-filling as possible, and they are willing to sacrifice a bit on the overall design. If each sub-design is created separately and combined together, one would end up with points too close to each other sacrificing too much of the overall design. One could try to optimize the MaxPro criterion for each design separately, while at the same time minimizing the overall MaxPro criterion, but computationally it is advantageous to have a single criterion computation. This technical advantage speeds up computations, and does not require considering each subdesign separately. The design point replacement approach with modified MaxPro allows one criterion to handle the choice of design points, but also allow flexibility to put weights on what is more important: the overall design or the projected sub-designs.

Figure 18A:
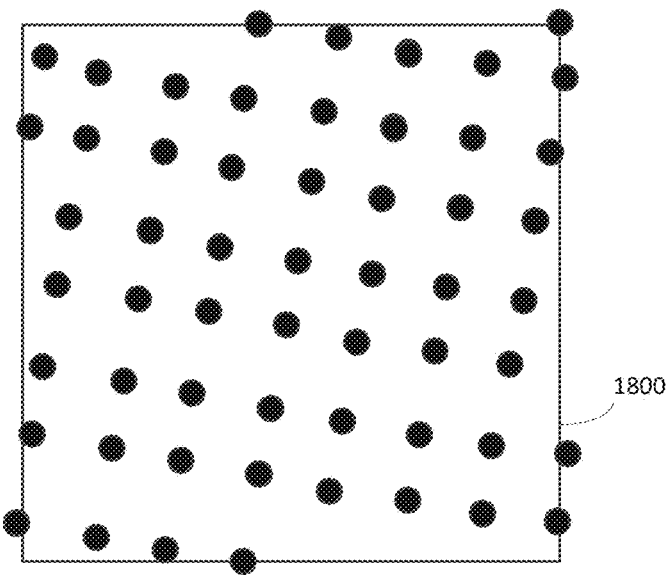
FIGS. 18A-18F illustrate a block diagram of design point selection in at least one embodiment involving design point replacement.
Figure 18B:
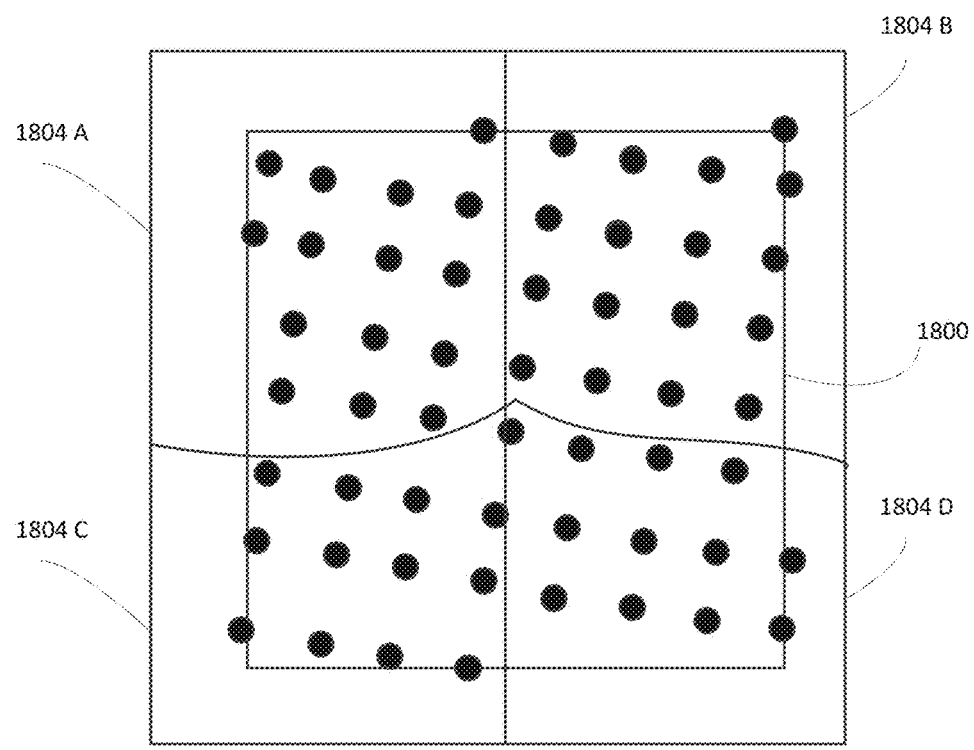

FIGS. 18A-18 illustrates a block diagram of design point selection in at least one embodiment involving design point replacement. FIG. 18A shows generated representative points distributed in the design space 1800. FIG. 18B shows the representative points in design space 1800 clustered into primary clusters 1804A-1804D. With either design point replacement or level swapping, the clustering can produce primary clusters with different amounts of representative points as shown in FIG. 18B or the same amount of representative points as shown in FIG. 16B.

Figure 18C:
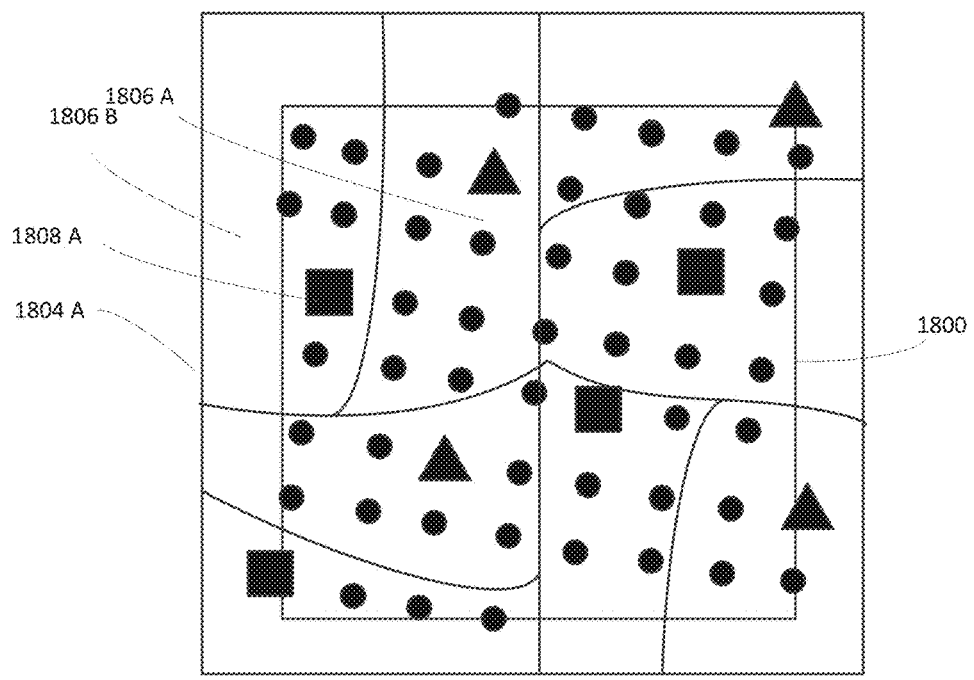

As shown in FIG. 18C, the primary clusters 1804 A-D of design space 1800 are separated into sub-clusters for allocation of two levels of a categorical factor to each of the primary clusters. For example, primary cluster 1804 A is separated into sub-clusters 1806A and 1806B. A design point is selected from the representative points in each of the sub-clusters and allocated one of the two levels. For example, design point of level 1 1808 A is selected in sub-cluster 1806B.

Figure 18D:
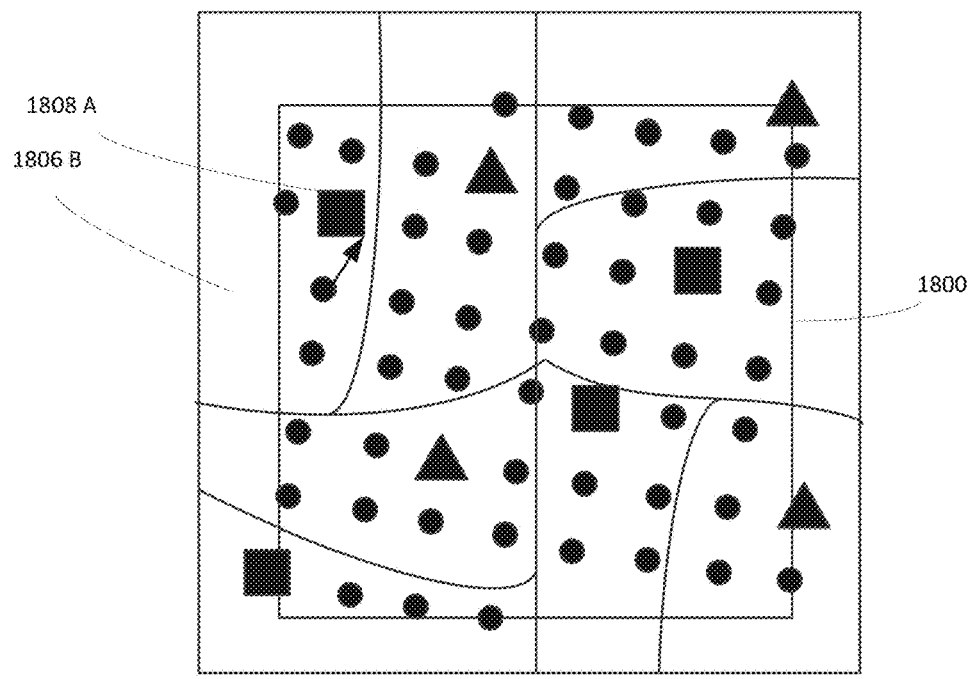
Figure 18E:
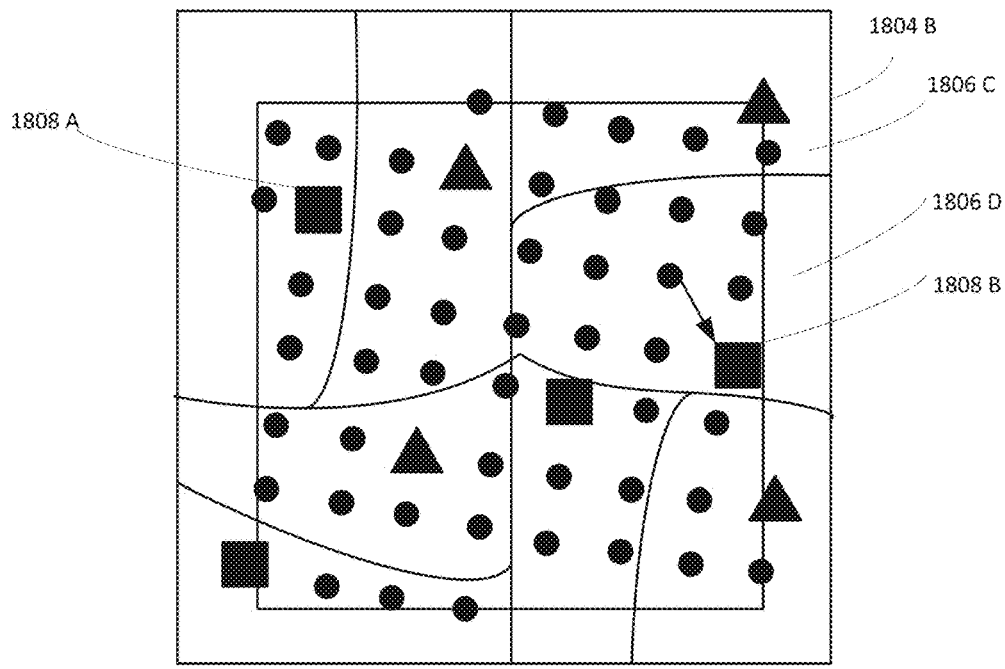
Figure 18F:
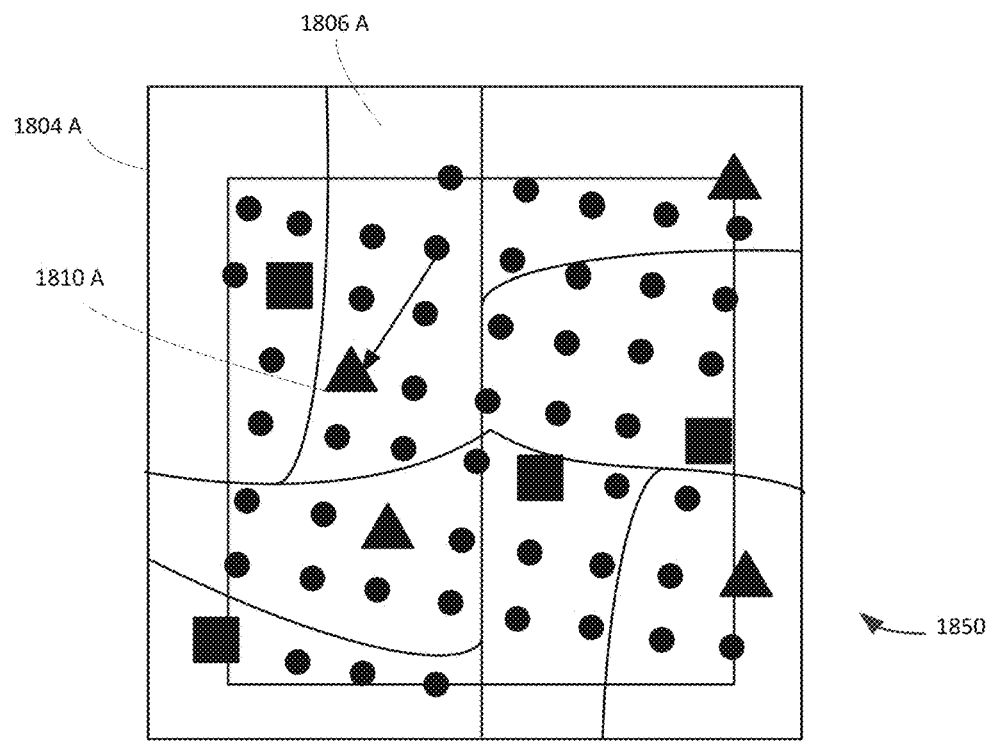

As shown in FIG. 18D, the location of design point of level 1 1808 A is moved to a different location of a representative point in design space 1800 (e.g., in the same sub-cluster 1806 B). In one or more embodiments, each reselected design point replaces a corresponding initial design point in a same sub-cluster. As shown in FIG. 18E since the reselected design point 1808 A increases or improves the separation of design points allocated of level 1 in a sub-design for level 1, the modified sub-design is selected and another design point of level 1 1808 B is selected in sub-cluster 1806 D of cluster 1804 B. Alternatively, or additionally modification could involve modifying another sub-design for a different level. FIG. 18F shows modification of a design point allocated a different level (level 2) 1810 A in sub-cluster A.

Figure 19A:
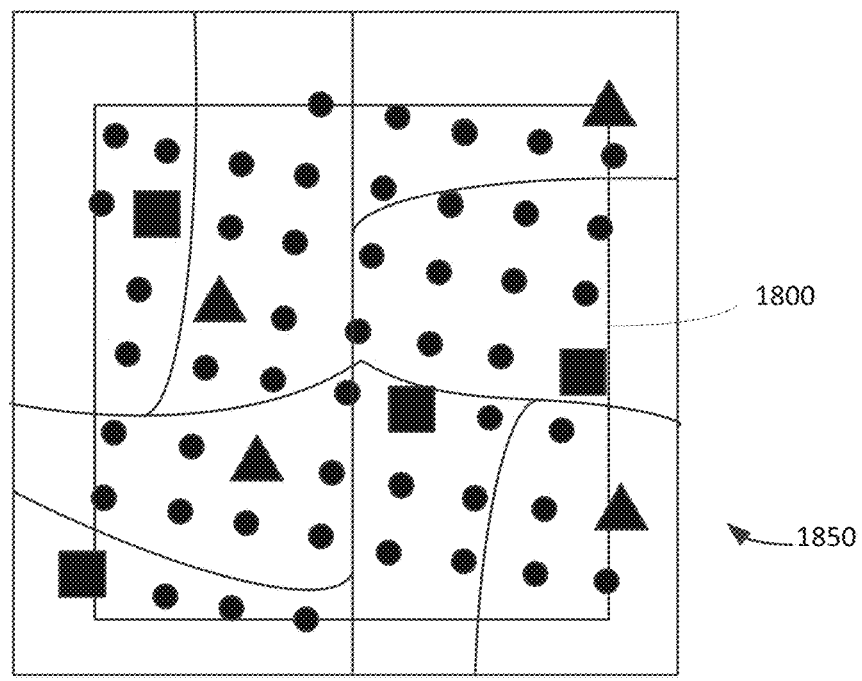
FIGS. 19A-19B illustrate a block diagram of design point selection in at least one embodiment involving level swapping and design point replacement.
Figure 19B:
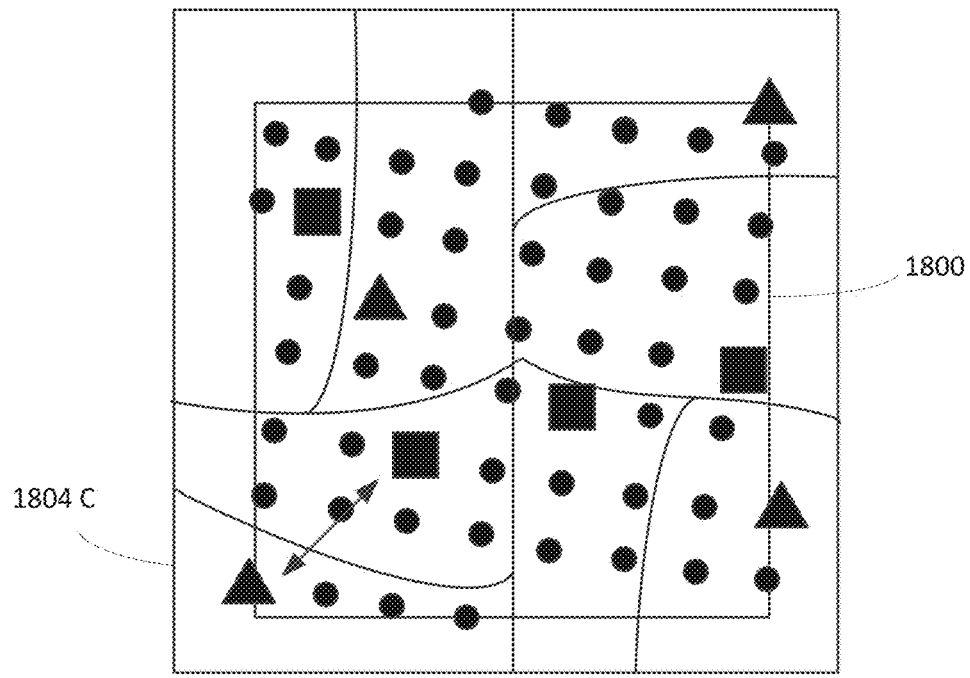

As shown in FIGS. 19A-B, design point replacement can be used in conjunction with level swapping. For example, FIG. 19A shows a design 1850 from the design point replacement as shown in FIGS. 18A-F. FIG. 19B shows level swapping in primary cluster 1804 C from the allocation produced by design point replacement shown in FIG. 19A.

Figure 20A:
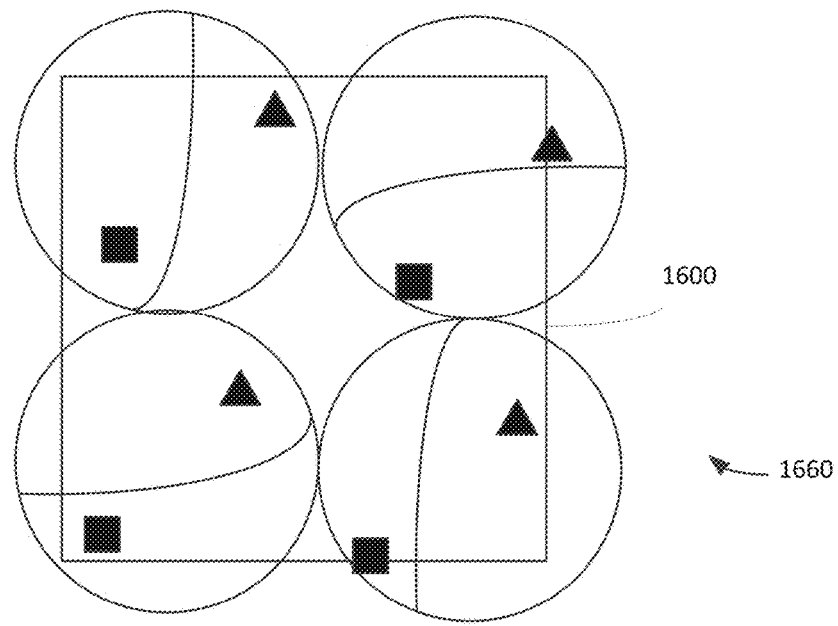
FIGS. 20A-20B illustrate a block diagram of design point selection in at least one embodiment involving level swapping and design point replacement.
Figure 20B:
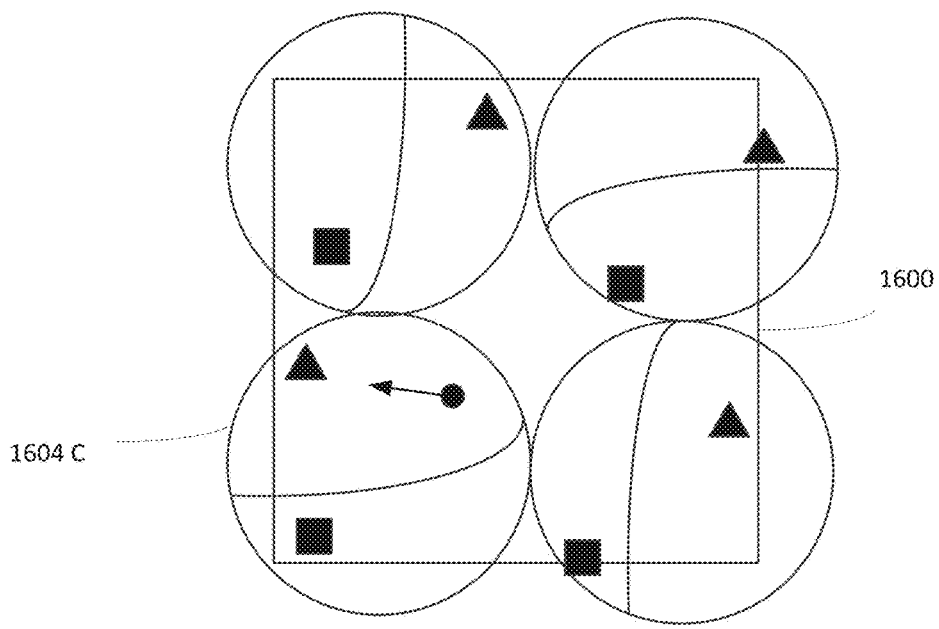

FIGS. 20A-20B show an alternative way to use design point replacement in conjunction with level swapping. FIG. 20A shows a design 1600 for design space 1600 from level swapping as shown in FIGS. 16A-16J. FIG. 20B shows design point replacement for primary cluster 1604 C from the allocation produced by the level swapping. Of course, one of ordinary skill in the art will appreciate other ways to use design point replacement in conjunction with level swapping (e.g., alternating between these techniques). In one or more embodiments, a modification of an initial sub-design involves performing two modifications one of level-swapping and one of design point replacement.

Figure 21:
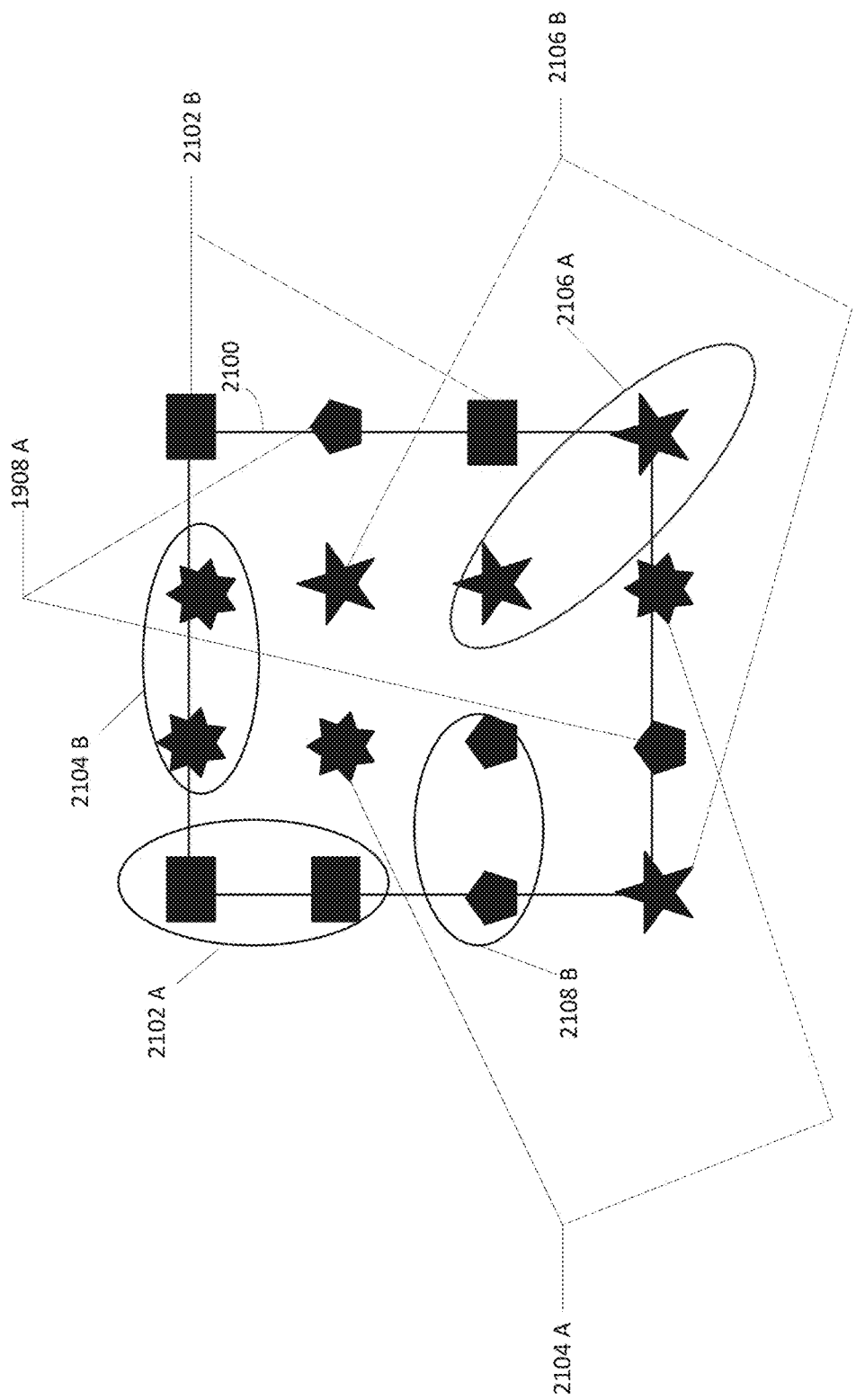
FIG. 21 illustrates clustering in at least one embodiment of the present technology.

In one or more embodiments, representative points are clustered into primary clusters and sub-clusters. FIG. 16A and FIG. 18A show clustering representative points close in proximity. FIG. 21 shows an alternative manner of clustering, in which the clustering results in intertwined clusters. FIG. 21 shows four different clusters 2102, 2104, 2106 and 2108 in design space 2100 with some sections of a cluster close together (e.g., representative points in an A section or B section) and some sections of the cluster separated (e.g., sections A and B are separated from each other).

There are many techniques that can be employed for clustering herein. One example, is using hierarchical clustering. The hierarchical clustering method starts with each observation forming its own cluster. At each step of the hierarchical clustering method, the distance between each pair of clusters is computed, and clusters are combined that are closest together. This process continues until all the observations are contained in a particular number of clusters (e.g., the required number of primary clusters). Hierarchical clustering is also called agglomerative clustering because of the combining approach that it uses.

Another example include k-means clustering. In k-means clustering, a specified number of clusters are constructed using an iterative algorithm that partitions the observations. The method, called k-means, partitions observations into clusters so as to minimize distances to cluster centroids. One of ordinary skill in the art will appreciate other means of clustering including (e.g., normal mixtures, partitioning methods, fuzzy clustering, density-based clustering, model-based clustering and other clustering described herein).

Figure 22:
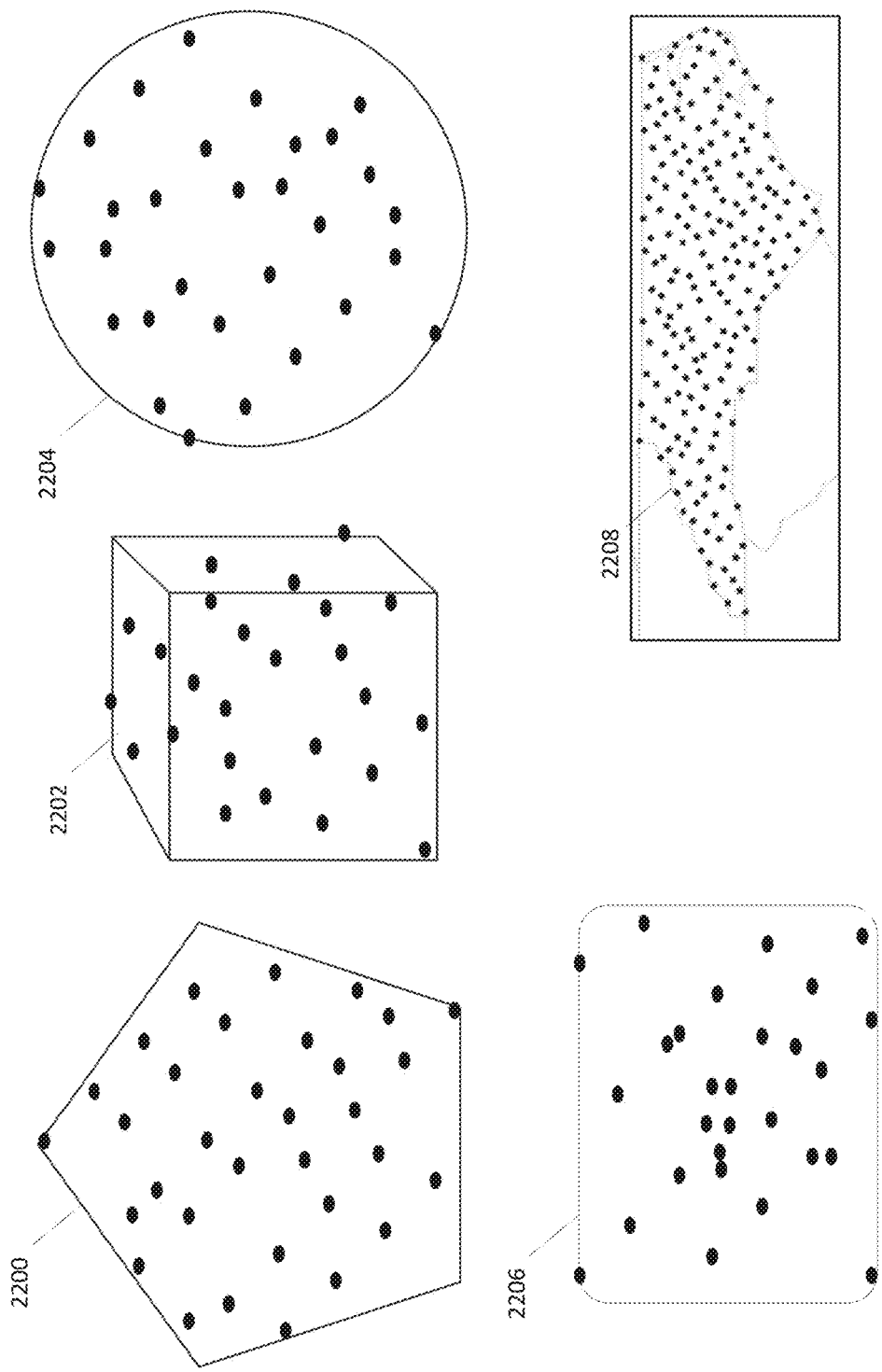
FIG. 22 illustrates an example of design spaces in some embodiments of the present technology.

FIG. 22 shows different example design spaces for one or more embodiments described herein. The design spaces 2200, 2204, 2206, and 2208 are examples of design spaces that are non-rectangular. Design space 2202 has borders of sides that are rectangular for a three dimensional shape. In one or more embodiments, a computing device (e.g., computing device 1302 of FIG. 13) displays, on a display device (e.g., display 1326) a graphical user interface for user entry of information defining the boundary for the design space. For instance, the user in one or more embodiments enters information that may represent a formula for one or more portions of the boundary of a design space. Alternatively, the graphical user interface provides various selections (e.g., a circle, a pentagon) for a design space and the user can select a design space. Alternatively, the graphical user interface allows a user to upload a file with individual user points or an image (e.g., an image of the boundary of the State of North Carolina) that a computing device then translates into a boundary for the design space.

Figure 23A:
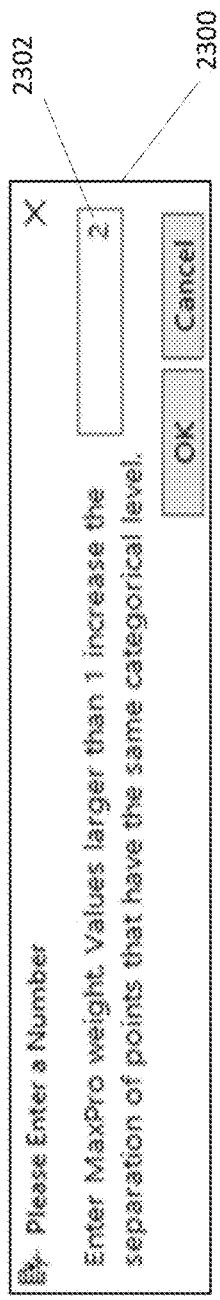
FIGS. 23A-23B illustrate examples of graphical interfaces in at least one embodiment of the present technology.
Figure 23B:
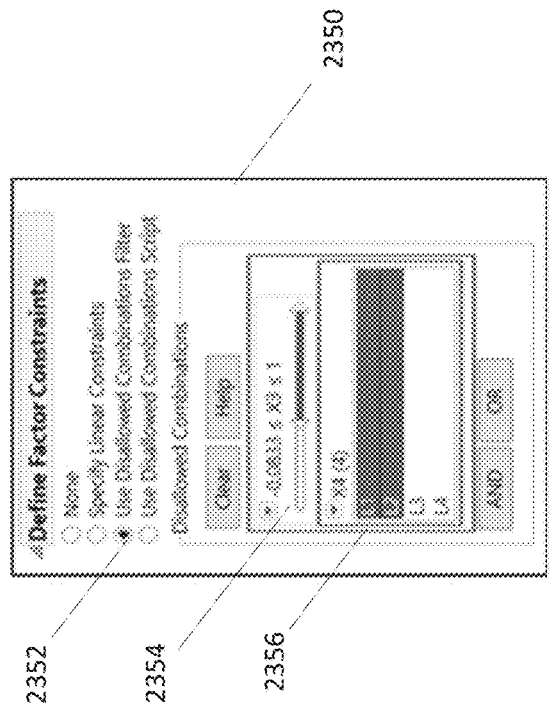

FIGS. 23A-23B shows other example graphical user interfaces for selection of criteria related to one or more categorical factors and/or levels associated with a categorical factor for the design space. For instance, the selection could describe all the categorical factors. As shown in FIG. 23A, the graphical user interface 2300 displays a text box 2302 for entry of a weight to describing tuning of design points that have a same categorical level. In one or more embodiments, the selection is related to the representative design points that will be allocated a level of a categorical factor. In one or more embodiments, the selection is related to controlling the particular categorical factors or levels. For example, as shown in FIG. 23B a graphical user interface 2350 allows a user to select categorical factors of combinations that are not allowed in particular situations (e.g., certain values of a categorical factor that cannot be used when a continuous variable is within a certain range). For example, as shown in FIG. 23B, the user has selected a disallowed combinations filter, criteria 2352. A level selection 2356 in FIG. 23B allows a user to specify the levels for a categorical factor X4 for the space that cannot be used when continuous variable X3 has the values selected using the spectrum 2354. The spectrum 2354 allows the user to adjust the range for a continuous variable X3 in this disallowed combination. Alternatively, a user could use a "Disallowed Combinations" script to upload a script to automatically choose points in the allowable design space rather than use user entry of continuous or categorical factors. One of ordinary skill in the art will appreciate different selections that could be presented to selected or otherwise describe criteria related to aspects of the design space (e.g., continuous variables, categorical factors, and/or levels associated with a categorical factor for the design space).

Figure 24A:
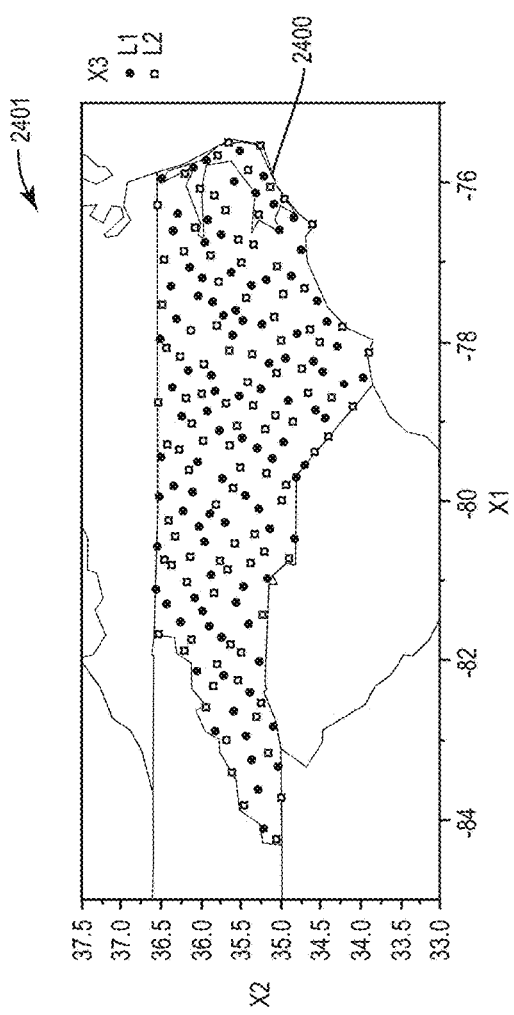

FIG. 24A shows an example embodiment involving a design space 2400 with a non-rectangular boundary (i.e., the boundary of the State of North Carolina). The design space 2400 is two dimensional with two continuous variables for design 2401 defining the latitude and longitude of the design space. The design 2401 has two sub-designs, one for each level (L1, L2) of a categorical factor (categorical factor X3) in which level swapping is used. Design space 2400 is useful for experiments in the State of North Carolina. For example, design space 2400 in one or more embodiments is used for an experiment in which air quality is tested across the State of North Carolina. It would be good to distribute air quality sensors distributed uniformly across North Carolina both within and at the border of the state. There may be more than one type or supplier of air quality sensors, and it would be good to also evenly distribute the different types of air quality sensors across the state without having overlapping air quality sensors of different types. Alternatively or additionally, an experiment using the model could have physical aspects (e.g., collecting data with physical sensors) and computer-simulated aspects (e.g., collecting data with simulators). The type of the air quality sensor or the method of data collection (physical or computer simulator) could then be categorical factor X3 for the design 2401 with the different types allocated a level 1 (L1) and a level 2 (L2). Thus, design 2401 is useful for an experiment with categorical factors combined with continuous variables. Two aspects are considered for the design. First, the design when looking at just the continuous factors should have good space-filling properties. Second, for each level of a categorical factor, the sub-design for the continuous factors should have good space-filling properties. Design 2401 was produced using a level-swapping approach according to one or more embodiments described herein.

Figure 24B:
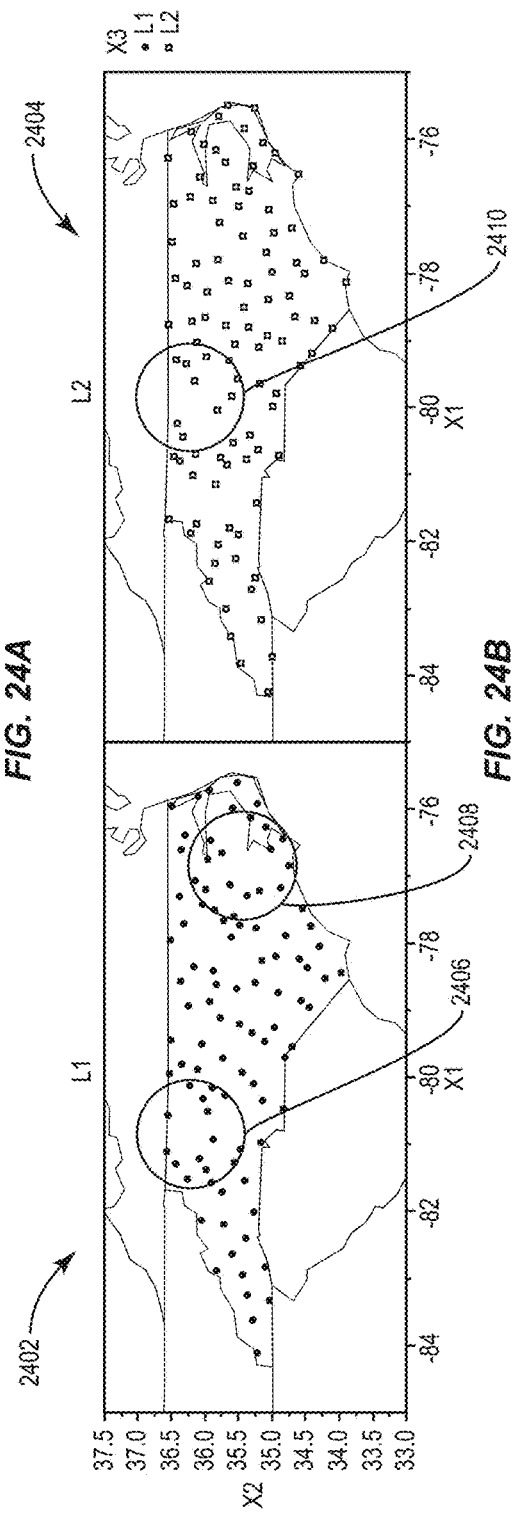

FIG. 24B shows the sub-designs separated with sub-design 2402 showing just the distribution of design points allocated level 1 (L1) for a categorical factor X3 and sub-design 2404 showing just the distribution of design points allocated level 2 (L2) for a categorical factor X3. Generally, the sub-designs have achieved good distribution of the design points. However, as shown, in regions 2406, 2408 and 2410 there are still some regions of the design space that have clumped together creating coverage holes in the distribution.

FIG. 24C shows an example embodiment in which design point replacement is used for the same design space 2400. The modified MaxPro Criterion and a received weight of 4 is used to produce the design 2411. FIG. 24D shows the sub-designs for design 2411 separated with sub-design 2412 showing just the distribution of design points allocated level 1 (L1) for a categorical factor and sub-design 2414 showing just the distribution of design points allocated level 2 (L2) for a categorical factor X3. Regions 2406, 2408 and 2410 in this example show a better distribution for each of the sub-designs than in FIG. 24B that used one level swapping approach. In different embodiments, the level-swapping approach could produce a better distribution than design point replacement or a combination of approaches could provide a better distribution than either approach alone.

Figure 24E:
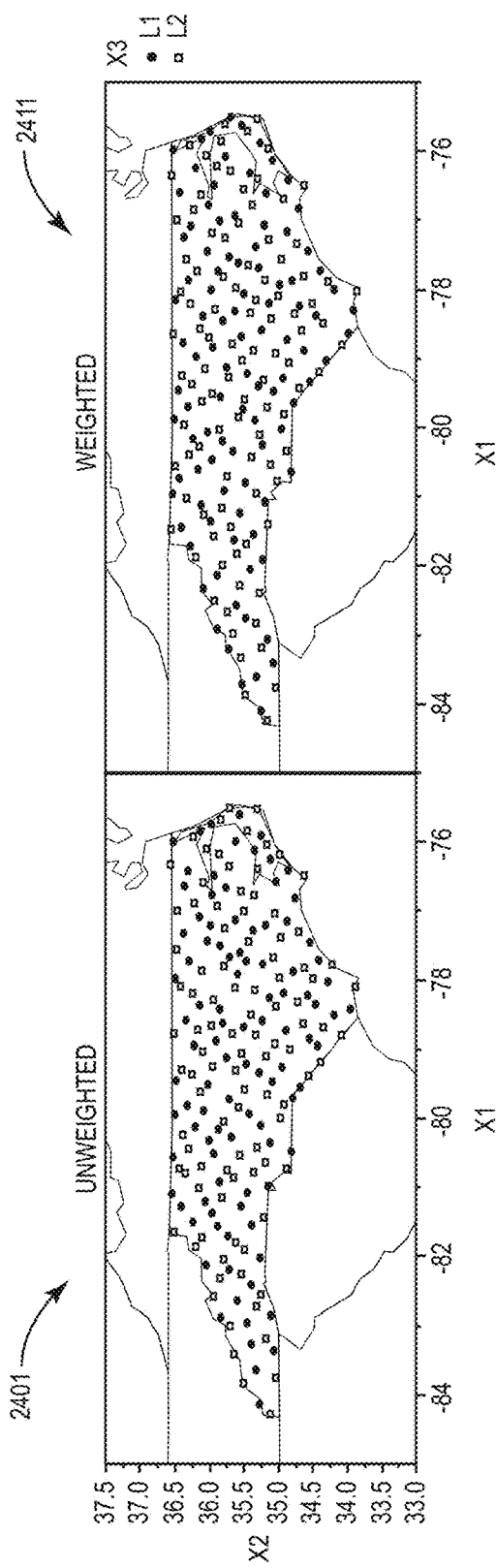
Figure 24F:
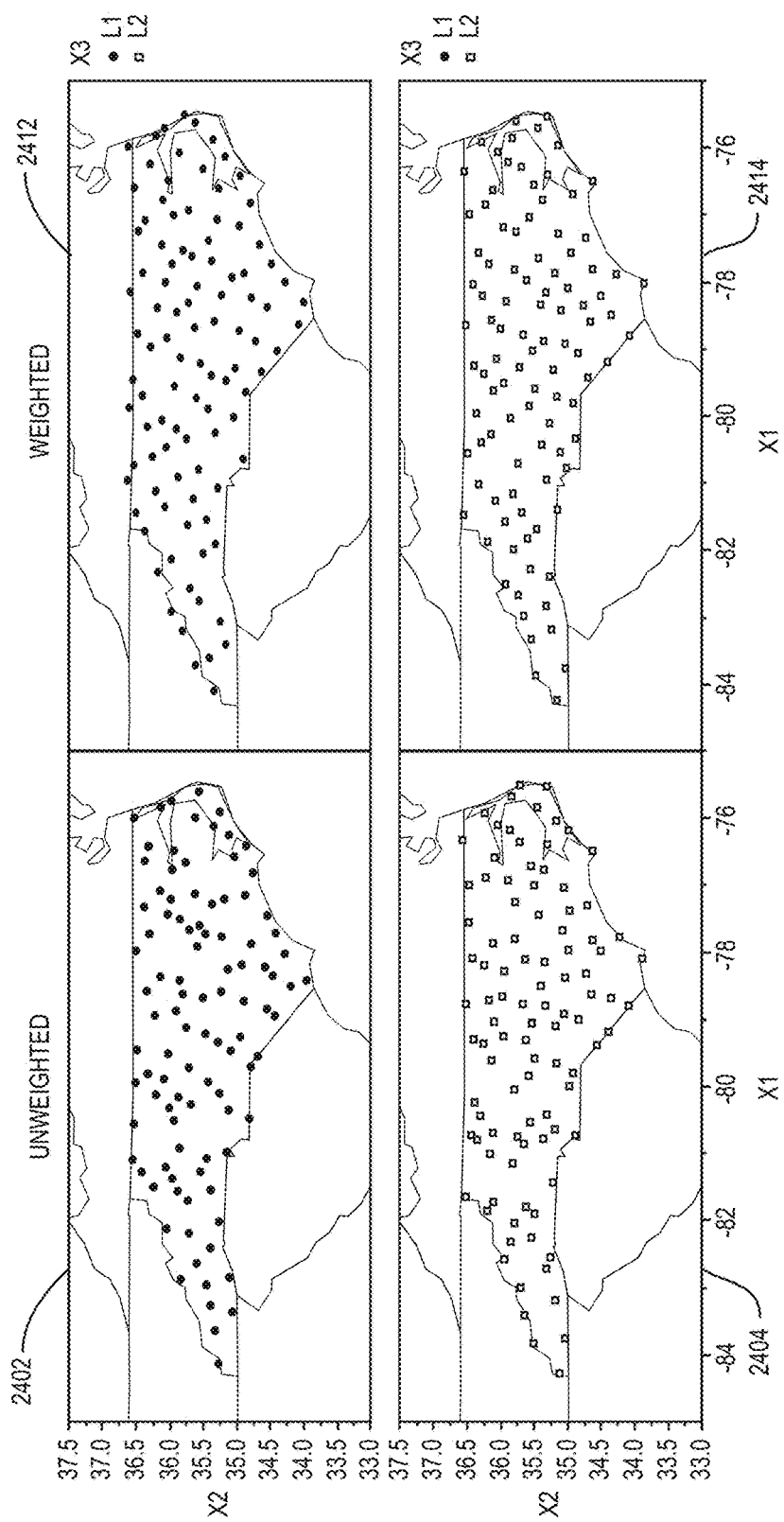

FIG. 24E shows a side-by-side comparison of the design 2401 and design 2411. Since design 2411 was produced with level swapping and the modified MaxPro criterion, it can be referred to as a weighted design in distinction from design 2401, which can be considered unweighted. FIG. 24F shows a side-by-side comparison of the sub-designs 2402, 2412, 2404 and 2414 of FIGS. 24B and 24D.

Figure 25A:
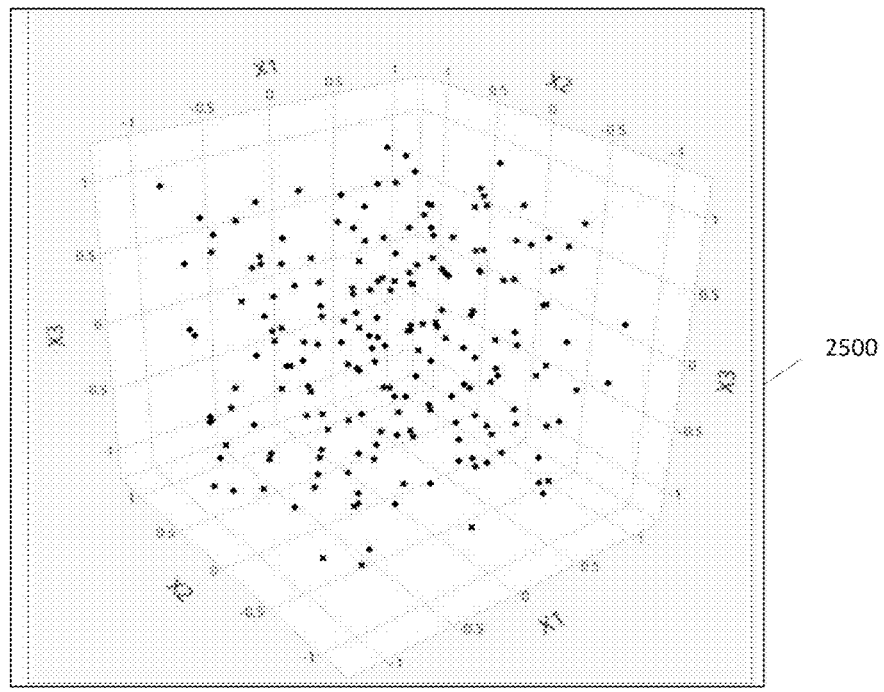
FIGS. 25A-25B illustrate examples of a design space in at least one embodiment of the present technology.
Figure 25B:
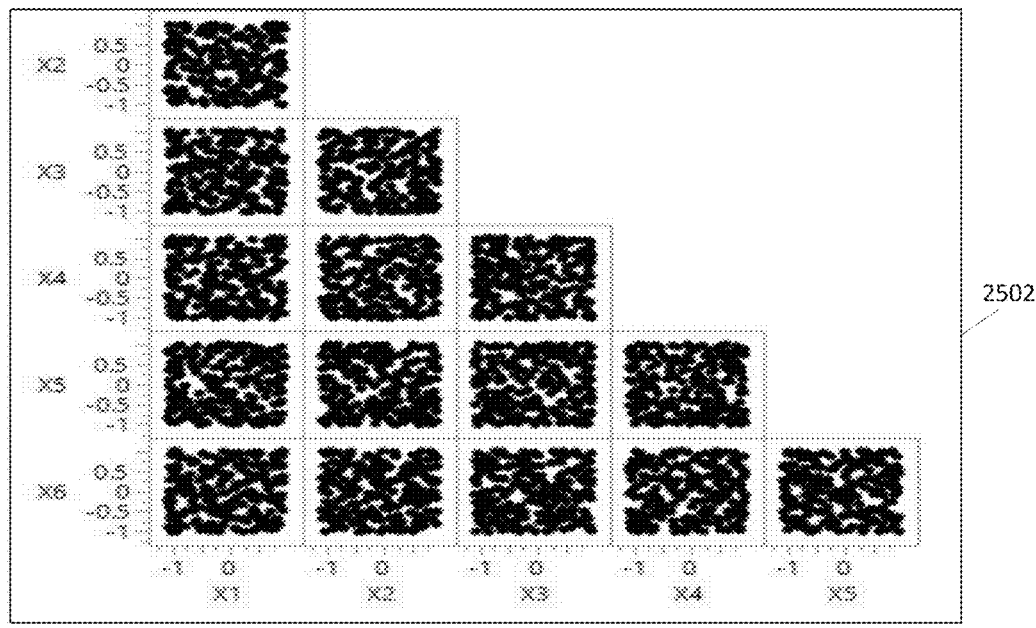

One or more embodiments herein are useful for multi-dimensional design spaces that test multiple continuous factors. FIGS. 25A-25B show an example of a space-filling design for 200 design points or computational runs with 6 continuous factors (X1-X6) and a two-level categorical factor. The distribution of points in each of the dimensions can be represented graphically by two-factor projections of the full design shown in FIG. 25B. FIG. 25A shows a scatterplot 2500 for a three-dimensional projection for the full design. Examples of continuous factors for an experiment are experiment dependent (e.g., physical dimensions, time, hardness, clarity, brightness, etc.).

Figure 26A:
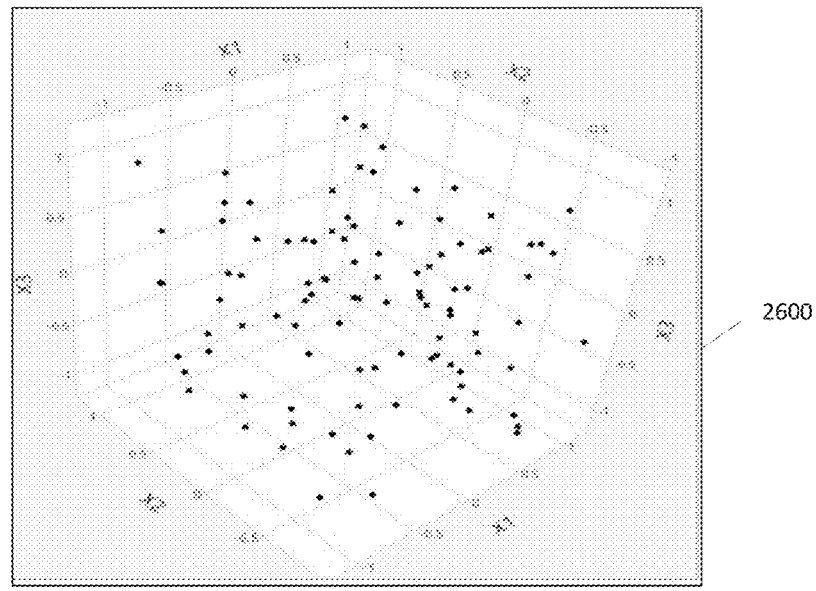
FIGS. 26A-26D illustrate examples of sub-designs in at least one embodiment of the present technology.
Figure 26B:
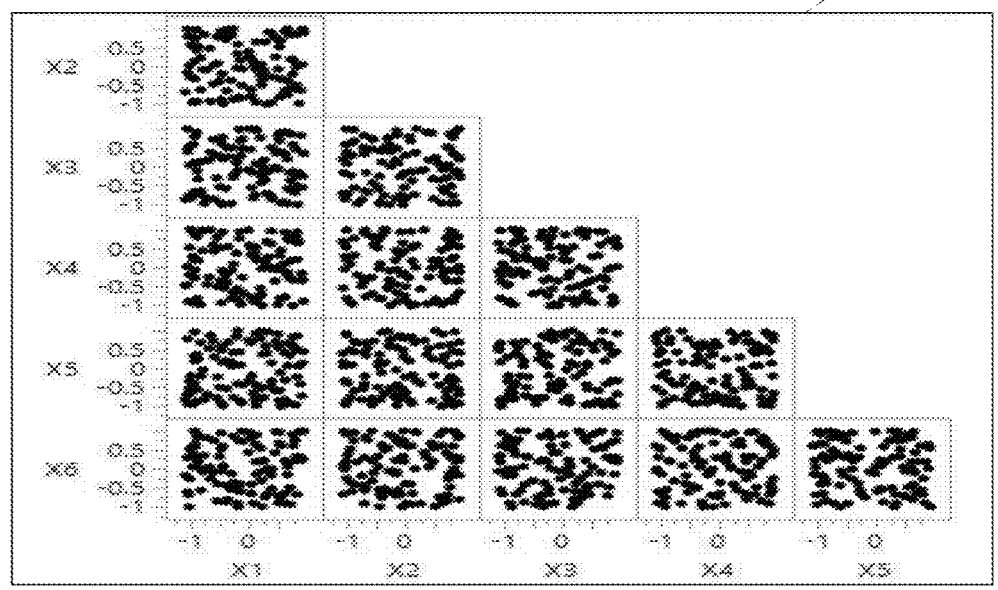
Figure 26C:
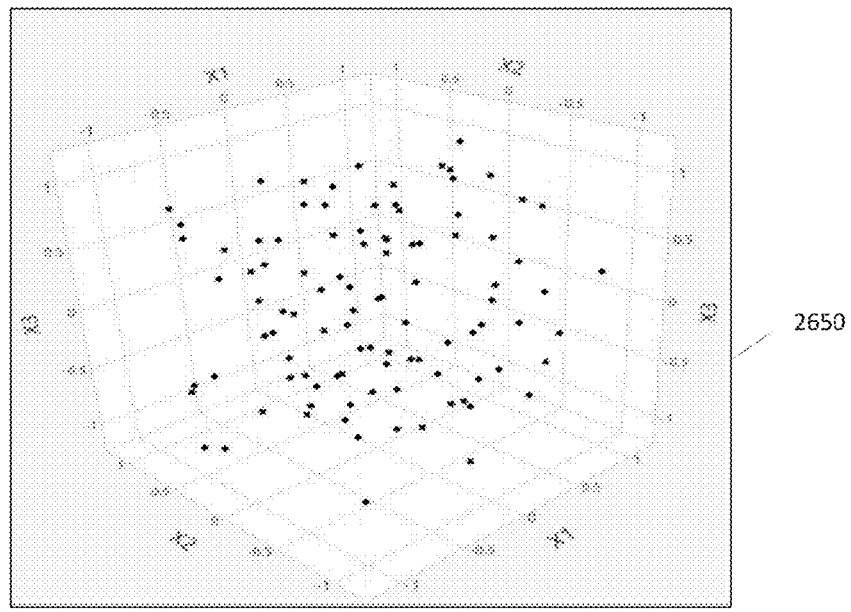
Figure 26D:
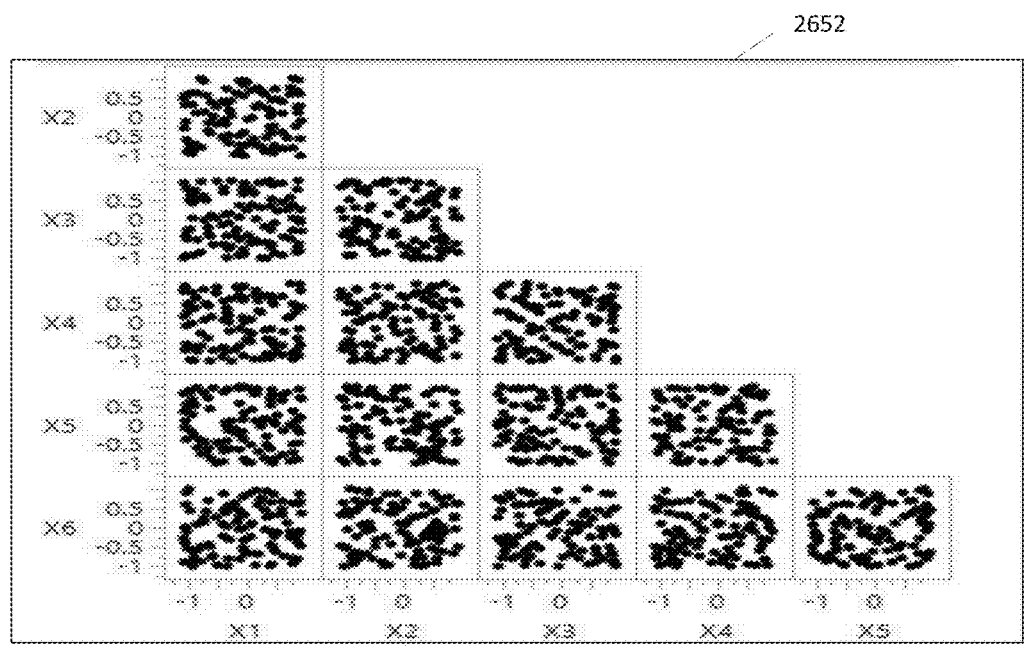

FIGS. 26A-26D shows each of the sub-designs for the example in FIG. 25A-25B. FIG. 26A represents a sub-design for a first level graphically as a scatterplot 2600 for a three-dimensional projection for the sub design. FIG. 26B represents a sub-design for a first level graphically as a scatterplot 2602 with two-factor projections for the sub-design. FIG. 26C represents a sub-design for a first level graphically as a scatterplot 2650 for a three-dimensional projection for the sub design. FIG. 26D represents a sub-design for a first level graphically as a scatterplot 2652 with two-factor projections for the sub-design.

Figure 27:
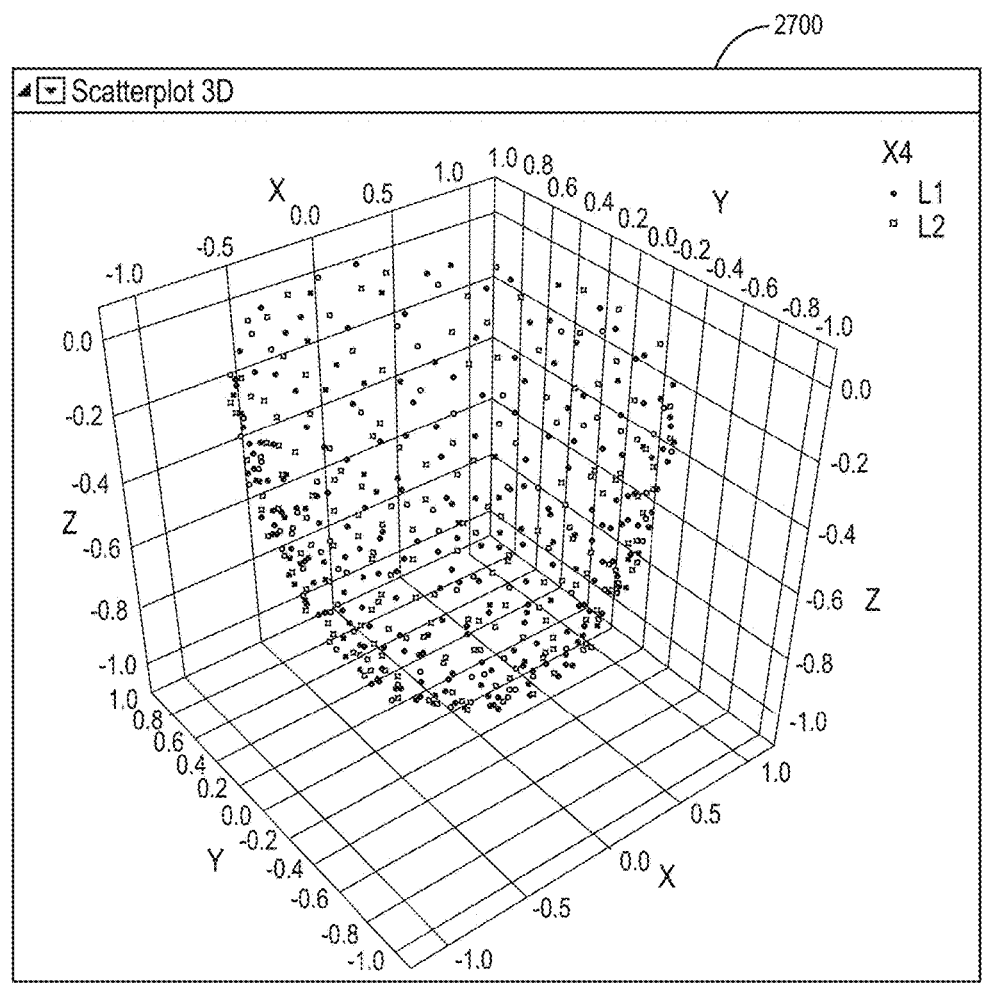
FIG. 27 illustrates an example of a design space in at least one embodiment of the present technology.
Figure 28A:
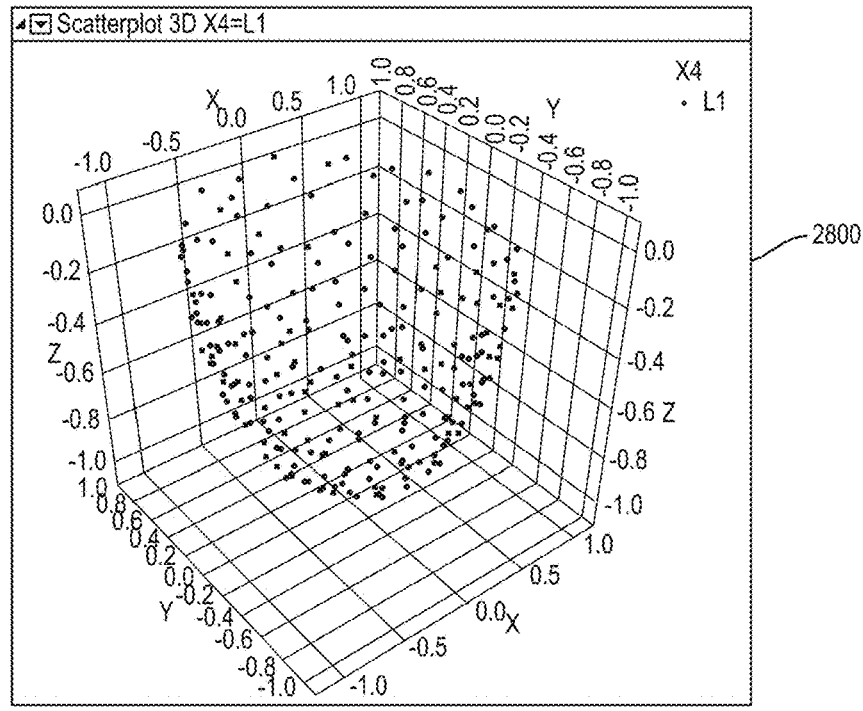
FIGS. 28A-28B illustrate examples of sub-designs in at least one embodiment of the present technology.
Figure 28B:
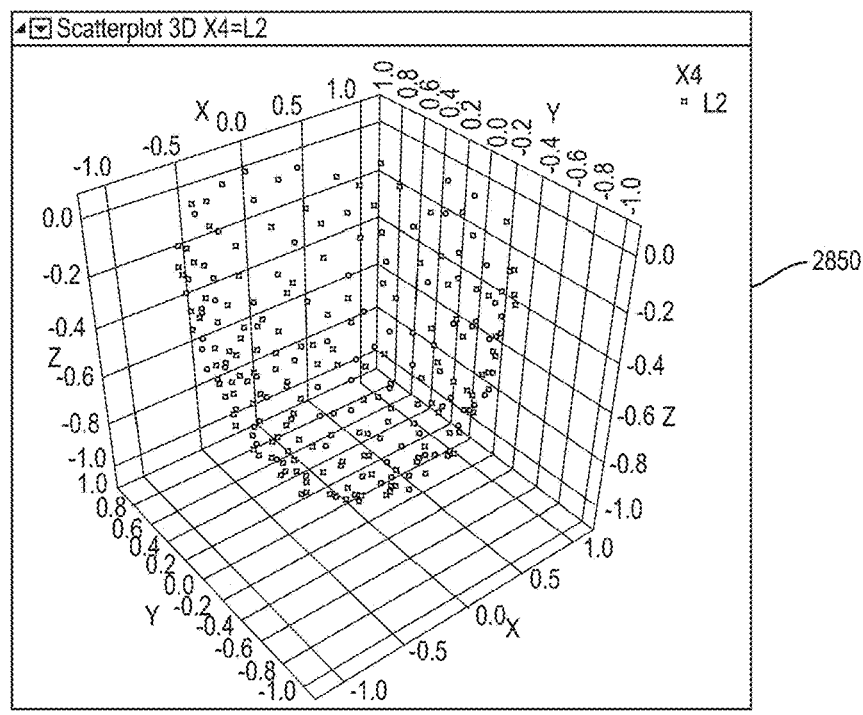

One or more embodiments are useful for space-filling a model of a three-dimensional physical object like a physical bowl as shown by the scatterplot 2700 in FIG. 27 with a categorical factor X4 of two levels L1 and L2. FIG. 28A shows the sub-design 2800 for L1, and FIG. 28B shows the sub-design 2850 for L2. This is useful for designing experiments on a physical object or model of a physical object (e.g., testing strain on a physical object, such as a physical bowl). Experiments on physical objects are useful for a variety of applications. For instance, space-filling designs for modeling heat transfer in an object are useful for building diagnostics, inspection of automotive and airplane parts (e.g., finding and quantifying defects), medical screening, inspection of artwork and historical monuments. For example, in the agriculture segment, space-filling designs are useful for modeling of produce objects which can be helpful for screening agriculture products (e.g., based on heat transfer, biological variability, fungi infestations, etc.).

One or more embodiments herein describe approaches that would be useful for designing a design space (e.g., for the experiment in FIGS. 24A-24F). In particular, one or more embodiments herein are useful for specifying categorical factors for allowable regions of a nonregular region (e.g., the State of North Carolina). One or more embodiments herein are useful for quickly designing a design space. From a processing standpoint, one or more criterion used herein are cheap to compute because they require less processing. For instance, with design point replacement using a modified or weighted MaxPro criterion, in considering moving a current design point with another point in a primary cluster, a method only needs to consider the other design points and the change in the weighted MaxPro criterion, which can be done in linear time. This also allows it to be threaded—each potential point can be considered separately and passed with the current design. This method can be combined with other techniques such as hierarchical clustering using the Fast Ward method of JMP® to achieve greater speed.

One or more embodiments herein achieve greater efficiency for known techniques of distributing design points. For example, instead of trying to optimize each subdesign and the full design simultaneously and deciding on appropriate weights in that regard, the modified MaxPro criterion uses a single tuning parameter for the weight, whereby a user can balance which is more important—the space-fillingness on the full design or the space-fillingness on the sub-designs.

One or more embodiments herein allow flexibility in run size (e.g., specifying the number of design points in the region) or in weighted or otherwise valuing distribution of categorical factors over overall distribution.

One or more embodiments allow flexibility in constraining the design space by allowing constraints on the design space, continuous variables for the design space, and categorical factors as described herein.

One or more embodiments herein provide advantages over other approaches for distributing design points in a design space. For example, general sliced Latin hypercube is an approach that approximates a design as a rectangle or cube with multiple layers, at each of which there are multiple Latin hypercube designs that can be sliced into smaller Latin hypercube designs at the next layer. Due to constraints based on this approaches underlying mathematical computations, this approach is inflexible for run size because a certain amount of runs is required to perform the computations, is not amenable to nonregular or rectangular regions, and cannot place weight on valuing distribution of a sub-design over the overall design.

A useful metric for comparing the performance of general sliced Latin Hypercube (SLHD) to an approach described herein which can be referred to as fast flexible filling (FFF) is shown below.

$$Mm_q = \min_r \left( \frac{1}{\binom{n}{2}} \sum_{i=1}^{n-1} \sum_{j=i+1}^{n} \frac{1}{d_{qr}^{2q}(x_i, x_j)} \right)^{-\frac{1}{2q}}$$

where: $Mm_q$ is a maximum measure for projection dimension q;
 r is the worst-case projection of dimension q
 $d_{qr}$ is the Euclidean distance between $x_i$ and $x_j$ in the r projection of dimension q; and
 n is the number of design points or run designs.

Figure 29:
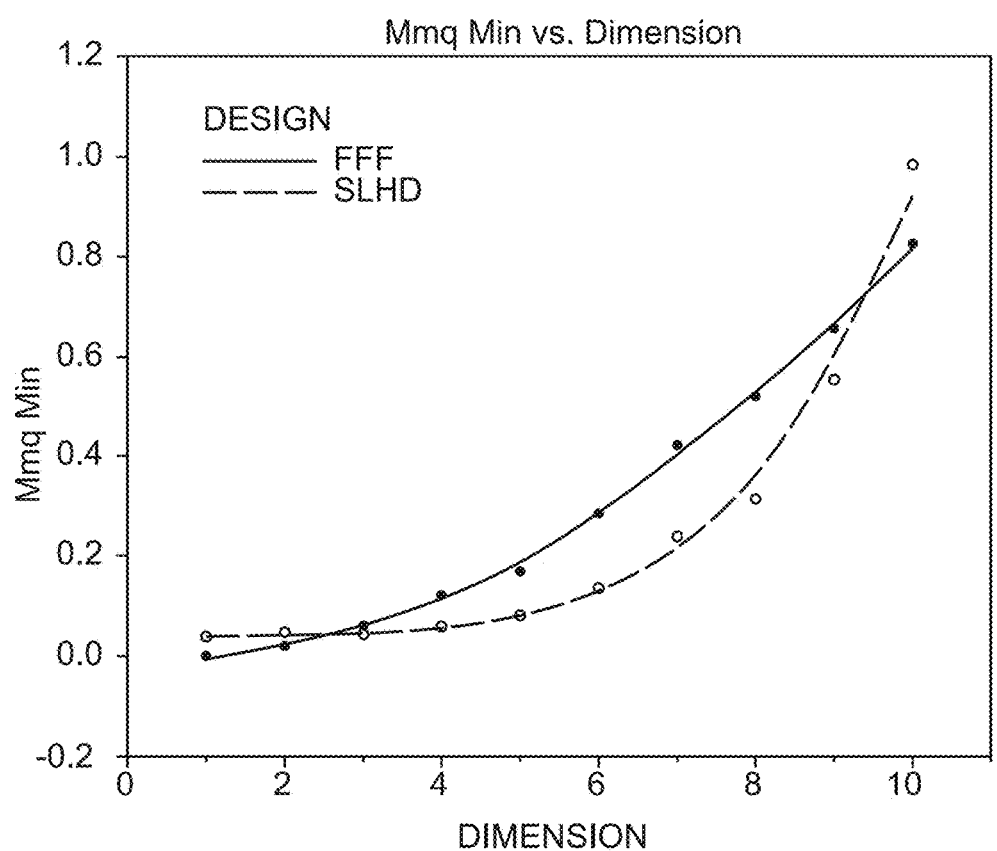
FIG. 29 illustrates an example of a comparison of performance in at least one embodiment of the present technology compared to sliced hypercube design.

FIG. 29 shows a graphical comparison 2900 of the $Mm_q$ values for FFF unweighted and SLHD. When comparing approaches, a larger value of $Mm_q$ is preferred. Both approaches are applied to a 200-run design with 10 continuous factors and a 4-level categorical factor across design spaces of different dimensions ranging from 1 to 10. Only in dimensions 1 and 10, does SLHD performs better.

Figure 30:
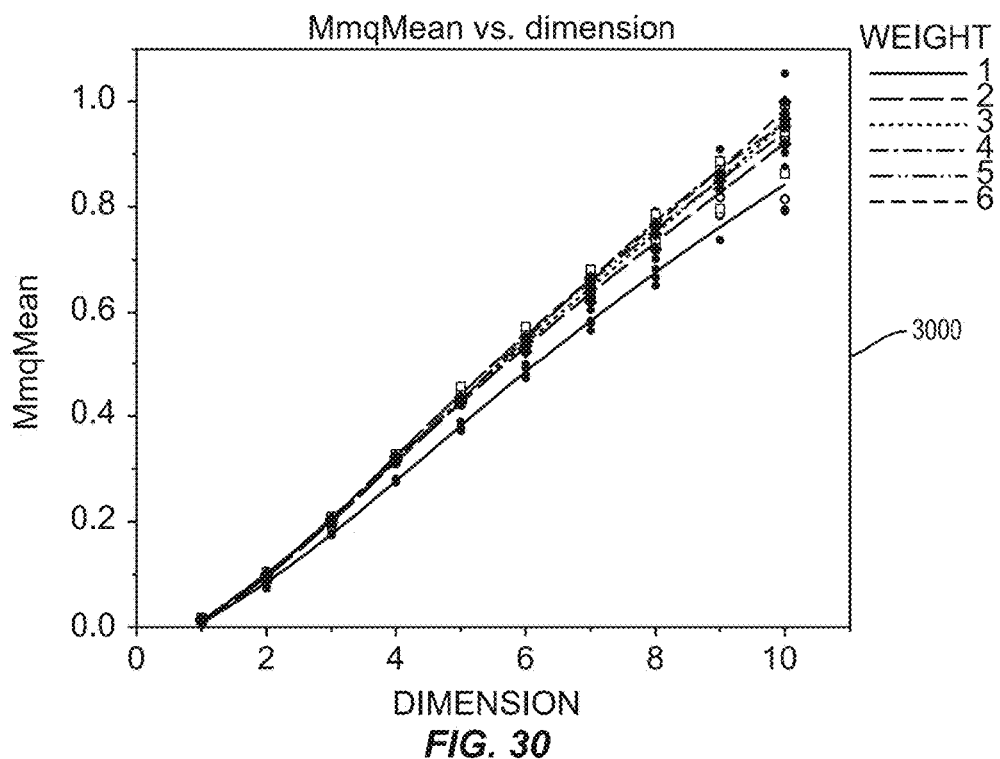
FIG. 30 illustrates an example of a comparison of performance of different weights for a sub-design in at least one embodiment involving design point replacement.

FIG. 30 shows a graphical comparison 3000 of the average $Mm_q$ values for all the sub-designs for SLHD and FFF weighted with weights ranging from 1 to 6. Both approaches are applied to a 200-run design with 10 continuous factors and a 4-level categorical factor across design spaces of different dimensions ranging from 1 to 10. A smoother is applied to the line's connecting the plotted points to get an idea of the fit. For the sub-designs, using a weight of 1 is notably worse than putting any weight on improving sub-designs (i.e. a weight >1).

Figure 31:
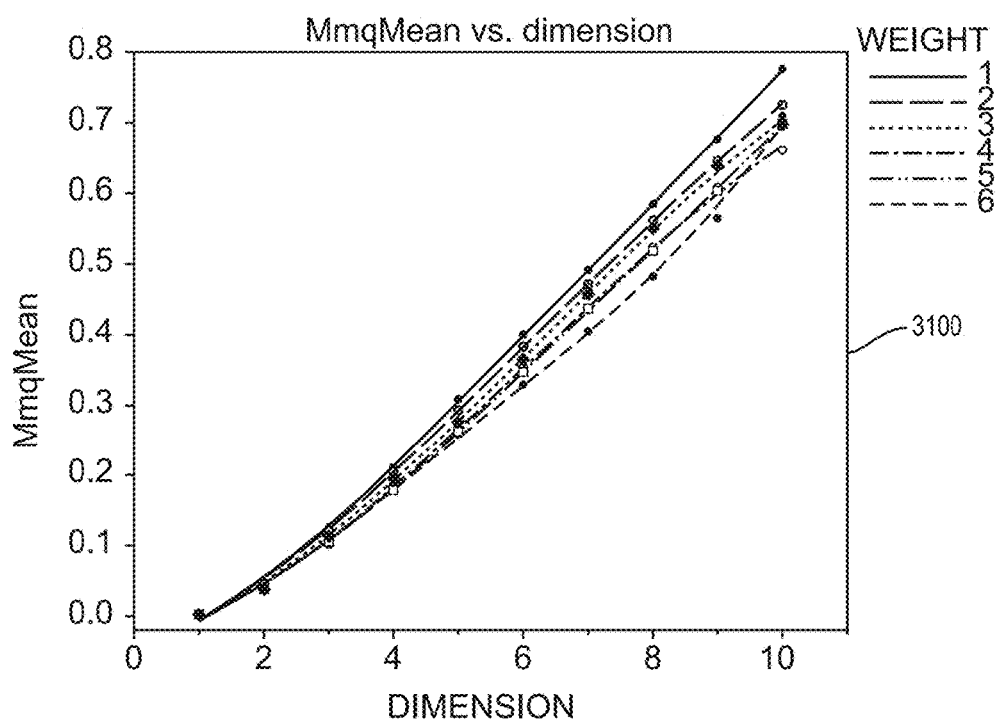
FIG. 31 illustrates an example of a comparison of performance of different weights for a design in at least one embodiment involving design point replacement.

FIG. 31 shows a graphical comparison 3100 of the $Mm_q$ value for the overall design for SLHD and FFF weighted with weights ranging from 1 to 6. Both approaches are applied to a 200-run design with 10 continuous factors and a 4-level categorical factor across design spaces of different dimensions ranging from 1 to 10. For the overall-design, a weight of 1 is best, as expected since this does not favor the sub-designs over the designs, but if the categorical factor is considered important, the tradeoff is not extreme.

As shown in FIGS. 29-31, one or more embodiments improve traditional computer approaches to space-filling designs for experiments. Computations of $Mm_q$ allow experimenters to try differing weights and compare the designs to decide what tradeoffs are preferable in optimizing the overall space-filling design or the space-filling design of individual sub-designs.

What is claimed is:

1. A computer-program product tangibly embodied in a non-transitory machine-readable storage medium, the computer-program product including instructions operable to cause a computing device to:
 receive information defining a boundary for a design space;
 generate representative points, each distributed on or within the design space and representing a potential design point for the design space;
 determine for the design space:
  primary clusters, each containing a different set of the representative points that is mutually exclusive of representative points in other primary clusters of the design space;
  a categorical factor, wherein the categorical factor defines a design category for the design space, the design category comprising discrete design options in the design category for the design space; and
  at least two levels for the categorical factor, wherein each of the at least two levels defines different ones of the discrete design options in the design category for the design space;
 for each of the primary clusters:
  determine a plurality of sub-clusters, each containing different subsets of a respective set of the representative points that is mutually exclusive of representative points in other sub-clusters of a respective primary cluster of the primary clusters;
  select a design point from each sub-cluster of the respective primary cluster based on a first criterion representing separation between design points in the design space; and
  allocate the at least two levels of the categorical factor, such that a level of the at least two levels is allocated to each selected design point in the respective primary cluster;
 obtain an initial sub-design that represents the selected design points in the design space allocated a given level of the categorical factor;
 modify the initial sub-design by increasing separation between design points allocated a same level of the categorical factor in the design space; and
 output to an output device a modified design for the design space, wherein the modified design represents locations for obtained design points in the design space in response to modification of the initial sub-design.

2. The computer-program product of claim 1, wherein the instructions are operable to cause the computing device to modify the initial sub-design by swapping a first level allocated to a first selected design point and a second level allocated to a second selected design point of a primary cluster of the design space, wherein the swapping comprises:
 replacing the first level allocated to the first selected design point and allocating it to the second selected design point; and
 replacing the second level allocated to the second selected design point and allocating it to the first selected design point.

3. The computer-program product of claim 1, wherein the instructions are operable to cause the computing device to modify the initial sub-design by:
 obtaining an initial average representing separation of design points in the design space by:
  for each of the at least two levels of the categorical factor, computing a second criterion representing separation between design points allocated a same level in the design space to obtain a plurality of computed second criterion, one for each of the at least two levels of the categorical factor; and
  averaging the plurality of computed second criterion;
 updating the initial average by:
  determining a first candidate design point and a second candidate design point of selected design points of a primary cluster in the design space;
  obtaining a swapped allocation for the design space by replacing a level allocated to the first candidate design point for the categorical factor with a level allocated to the second candidate design point for the categorical factor;
  generating an updated sub-design based on the swapped allocation;
  obtaining an updated average representing the separation of design points in the design space according to the swapped allocation; and
 when a difference between the updated average and the initial average indicates that for a majority of the selected design points in the design space, the updated sub-design achieves a greater separation of design points of a same level than the initial sub-design, modifying the initial sub-design of the design space by:
  replacing the initial sub-design with the updated sub-design; and replacing the initial average with the updated average.

4. The computer-program product of claim 1, wherein the instructions are operable to cause the computing device to modify the initial sub-design by, for a primary cluster, reselecting one or more design points of the representative points to replace corresponding ones of an initial design point to minimize a second criterion representing separation between design points allocated a given level.

5. The computer-program product of claim 4, wherein each reselected design point replaces a corresponding initial design point in a same sub-cluster.

6. The computer-program product of claim 1, wherein the instructions are operable to cause the computing device to modify the initial sub-design by:
receiving a weight for tuning a second criterion, different than the first criterion, the second criterion representing separation between design points in the design space;
selecting, using the weight for each level of the categorical factor, a design point location in the design space that is different than a design point location of the selected design points for the primary clusters; and
replacing a design point location of a selected design point for the primary clusters with the selected design point location.

7. The computer-program product of claim 6, the instructions are operable to cause the computing device to:
map the design space onto a matrix with rows and columns; and
select the design point location by minimizing the second criterion:

$$\min_{D} \psi(D)_w = \left\{ \frac{1}{\binom{n}{2}} \sum_{i=1}^{n-1} \sum_{j=i+1}^{n} \frac{I_w(c_i = c_j)}{\prod_{l=1}^{p}(x_{il} - x_{jl})^2} \right\}^{1/p}$$

where:
$\psi(D)_w$ is the second criterion;
i, j, l are integer counters;
w is the received weight;
n is an integer number of primary clusters for the design space;
p is an integer number of continuous variables for the design space;
$x_{ab}$ is an entry in row a and column b of the matrix; and
$I_w(c_{d1}=c_{d2})$ is an indicator variable that is w if a categorical level $c_{d1}$ allocated to a design point d1 and a categorical level $c_{d2}$ allocated to a design point d2 are the same, and 1 otherwise.

8. The computer-program product of claim 1, wherein the instructions are operable to cause the computing device, for each primary cluster of the design space, to determine whether to change a level allocated to a design point of a sub-cluster of the respective primary cluster of the design space.

9. The computer-program product of claim 1, wherein the instructions are operable to cause the computing device, for each primary cluster of the design space, to determine whether to select a replacement design point location for a design point in the respective primary cluster that increases separation between design points allocated a level of the categorical factor in the design space.

10. The computer-program product of claim 1, wherein the instructions are operable to cause the computing device to modify the initial sub-design by:
performing a first modification, the first modification comprising swapping a first level allocated to a first selected design point and a second level allocated to a second selected design point of a primary cluster of the design space;
performing a second modification, the second modification comprising replacing a representative point of the generated representative points with the first selected design point allocated a second level.

11. The computer-program product of claim 1, wherein the instructions are operable to cause the computing device to determine the primary clusters using hierarchical clustering.

12. The computer-program product of claim 1, wherein the instructions are operable to cause the computing device to:
map the design space onto a matrix with rows and columns; and
for each of the primary clusters, select a design point from each sub-cluster of the respective primary cluster by minimizing the first criterion:

$$\min_{D} \psi(D) = \left\{ \frac{1}{\binom{n}{2}} \sum_{i=1}^{n-1} \sum_{j=i+1}^{n} \frac{1}{\prod_{l=1}^{p}(x_{il} - x_{jl})^2} \right\}^{1/p}$$

where:
$\psi(D)$ is the first criterion;
i, j, l are integer counters;
n is an integer number of primary clusters for the design space;
p is an integer number of continuous variables for the design space; and
$x_{ab}$ is an entry in row a and column b of the matrix.

13. The computer-program product of claim 1, wherein the instructions are operable to cause a computing device to:
display, on a display device, a graphical user interface for user entry of information defining the boundary for the design space and selection of criteria related to the categorical factor and the at least two levels;
receive information defining the boundary by receiving, as user input via one or more input devices, information representing a non-rectangular boundary for the design space;
receive the selection; and
output to the output device a graphical representation of the design space with the non-rectangular boundary.

14. The computer-program product of claim 1, wherein a dimension of the design space represents a continuous variable for the design space.

15. The computer-program product of claim 1, wherein the design space comprises more than two dimensions.

16. The computer-program product of claim 1, wherein the instructions are operable to cause the computing device to receive information defining an integer number of the primary clusters.

17. The computer-program product of claim 1, wherein the instructions are operable to cause the computing device to output the modified design by outputting information to the output device representing locations of the obtained design points in a display of the design space.

18. The computer-program product of claim 1, wherein the design space is a computer-simulated model representing a physical object or representing an environment for placement of one or more physical objects at each of the obtained design points.

19. A computer-implemented method comprising:
receiving information defining a boundary for a design space;
generating representative points, each distributed on or within the design space and representing a potential design point for the design space;
determining for the design space:
primary clusters, each containing a different set of the representative points that is mutually exclusive of representative points in other primary clusters of the design space;
a categorical factor, wherein the categorical factor defines a design category for the design space, the design category comprising discrete design options in the design category for the design space; and
at least two levels for the categorical factor, wherein each of the at least two levels defines different ones of the discrete design options in the design category for the design space;
for each of the primary clusters:
determining a plurality of sub-clusters, each containing different subsets of a respective set of the representative points that is mutually exclusive of representative points in other sub-clusters of a respective primary cluster of the primary clusters;
selecting a design point from each sub-cluster of the respective primary cluster based on a first criterion representing separation between design points in the design space; and
allocating the at least two levels of the categorical factor, such that a level of the at least two levels is allocated to each selected design point in the respective primary cluster;
obtaining an initial sub-design that represents the selected design points in the design space allocated a given level of the categorical factor;
modifying the initial sub-design by increasing separation between design points allocated a same level of the categorical factor in the design space; and
outputting to an output device a modified design for the design space, wherein the modified design represents locations for obtained design points in the design space in response to modification of the initial sub-design.

20. The method of claim 19, wherein the modifying the initial sub-design comprises swapping a first level allocated to a first selected design point and a second level allocated to a second selected design point of a primary cluster of the design space, wherein the swapping comprises:
replacing the first level allocated to the first selected design point and allocating it to the second selected design point; and
replacing the second level allocated to the second selected design point and allocating it to the first selected design point.

21. The method of claim 19, wherein the modifying the initial sub-design comprises:
obtaining an initial average representing separation of design points in the design space by:
for each of the at least two levels of the categorical factor, computing a second criterion representing separation between design points allocated a same level in the design space to obtain a plurality of computed second criterion, one for each of the at least two levels of the categorical factor; and
averaging the plurality of computed second criterion;
updating the initial average by:
determining a candidate design point and another candidate design point of selected design points of a primary cluster in the design space;
obtaining a swapped allocation for the design space by replacing a level allocated to the candidate design point for the categorical factor with a level allocated to the another candidate design point for the categorical factor;
generating an updated sub-design based on the swapped allocation;
obtaining an updated average representing the separation of design points in the design space according to the swapped allocation; and
when a difference between the updated average and the initial average indicates that for a majority of the selected design points in the design space, the updated sub-design achieves a greater separation of design points of a same level than the initial sub-design, modifying the initial sub-design of the design space by:
replacing the initial sub-design with the updated sub-design; and
replacing the initial average with the updated average.

22. The method of claim 19, wherein the modify the initial sub-design comprises, for the primary cluster, reselecting one or more design points of the representative points to replace corresponding ones of an initial design point to minimize a second criterion representing separation between selected design points allocated a given level.

23. The method of claim 22, wherein each reselected design point replaces a corresponding initial design point in a same sub-cluster.

24. The method of claim 19, wherein the method further comprises:
receiving a weight for tuning a second criterion, different than the first criterion, the second criterion representing separation between design points in the design space;
selecting, using the weight for each level of the categorical factor, a design point location in the design space that is different than a design point location of the selected design points for the primary clusters; and
replacing a design point location of a selected design point for the primary clusters with the selected design point location.

25. The method of claim 24, wherein the method further comprises:
mapping the design space onto a matrix with rows and columns; and
wherein the selecting the design point location comprises minimizing the second criterion:

$$\min_{D} \psi(D)_w = \left\{ \frac{1}{\binom{n}{2}} \sum_{i=1}^{n-1} \sum_{j=i+1}^{n} \frac{I_w(c_i = c_j)}{\prod_{l=1}^{p} (x_{il} - x_{jl})^2} \right\}^{1/p}$$

where:
$\psi(D)_w$ is the second criterion;
i, j, l are integer counters;
w is the received weight;
n is an integer number of primary clusters for the design space;

p is an integer number of continuous variables for the design space;

$x_{ab}$ is an entry in row a and column b of the matrix; and $I_w(c_{d1}=c_{d2})$ is an indicator variable that is w if a categorical level $c_{d1}$ allocated to a design point d1 and a categorical level $c_{d2}$ allocated to a design point d2 are the same, and 1 otherwise.

26. The method of claim 19, wherein the method comprises determining, for each primary cluster of the design space, whether to change a level allocated to a design point of a sub-cluster of the respective primary cluster of the design space.

27. The method of claim 19, wherein the method comprises determining, for each primary cluster of the design space, whether to select a replacement design point location for a design point in the respective primary cluster that increases separation between design points allocated a level of the categorical factor in the design space.

28. The method of claim 19, wherein the modifying the sub-design comprises:

performing a first modification, the first modification comprising swapping a first level allocated to a first selected design point and a second level allocated to a second selected design point of a primary cluster of the design space;

performing a second modification, the second modification comprising replacing a representative point of the generated representative points with the first selected design point allocated a second level.

29. The method of claim 19, wherein the method comprises determining for the design space the primary clusters using hierarchical clustering.

30. A computing device comprising processor and memory, the memory containing instructions executable by the processor wherein the computing device is configured to:

receive information defining a boundary for a design space;

generate representative points, each distributed on or within the design space and representing a potential design point for the design space;

determine for the design space:

primary clusters, each containing a different set of the representative points that is mutually exclusive of representative points in other primary clusters of the design space;

a categorical factor, wherein the categorical factor defines a design category for the design space, the design category comprising discrete design options in the design category for the design space; and at least two levels for the categorical factor, wherein each of the at least two levels defines different ones of the discrete design options in the design category for the design space;

for each of the primary clusters:

determine a plurality of sub-clusters, each containing different subsets of a respective set of the representative points that is mutually exclusive of representative points in other sub-clusters of a respective primary cluster of the primary clusters;

select a design point from each sub-cluster of the respective primary cluster based on a first criterion representing separation between design points in the design space; and allocate the at least two levels of the categorical factor, such that a level of the at least two levels is allocated to each selected design point in the respective primary cluster;

obtain an initial sub-design that represents the selected design points in the design space allocated a given level of the categorical factor;

modify the initial sub-design by increasing separation between design points allocated a same level of the categorical factor in the design space; and output to an output device a modified design for the design space, wherein the modified design represents locations for obtained design points in the design space in response to modification of the initial sub-design.

* * * * *